(12) United States Patent
Fujine et al.

(10) Patent No.: US 8,384,654 B2
(45) Date of Patent: Feb. 26, 2013

(54) LIQUID CRYSTAL DISPLAY APPARATUS

(75) Inventors: Toshiyuki Fujine, Sakura (JP); Seiji Kohashikawa, Suzuka (JP); Yuhya Sekiguchi, Tsu (JP); Yuhichiro Yamaguchi, Yaita (JP)

(73) Assignee: Sharp Kabushiki Kaisha, Osaka (JP)

( * ) Notice: Subject to any disclaimer, the term of this patent is extended or adjusted under 35 U.S.C. 154(b) by 1331 days.

(21) Appl. No.: 12/092,817

(22) PCT Filed: Nov. 1, 2006

(86) PCT No.: PCT/JP2006/321847
§ 371 (c)(1),
(2), (4) Date: May 6, 2008

(87) PCT Pub. No.: WO2007/055131
PCT Pub. Date: May 18, 2007

(65) Prior Publication Data
US 2009/0262063 A1 Oct. 22, 2009

(30) Foreign Application Priority Data

Nov. 11, 2005 (JP) ................ 2006-327025
Feb. 8, 2006 (JP) ................ 2006-031769
Oct. 30, 2006 (JP) ................ 2006-293426

(51) Int. Cl.
*G09G 3/36* (2006.01)

(52) U.S. Cl. ............. 345/102; 349/61; 362/97.1

(58) Field of Classification Search .......... 345/102; 349/61–71; 362/97.1–97.4
See application file for complete search history.

(56) References Cited

U.S. PATENT DOCUMENTS 4,319,237 A * 3/1982 Matsuo et al. ........... 345/101
(Continued)

FOREIGN PATENT DOCUMENTS

| CN | 1462425 A | 12/2003 |
|---|---|---|
| GB | 2405520 A | 3/2005 |

(Continued)

OTHER PUBLICATIONS

English language computer Translation for JP-11-327454-A dated Nov. 26, 1999.

(Continued)

*Primary Examiner* — Michael Pervan
(74) *Attorney, Agent, or Firm* — Birch, Stewart, Kolasch and Birch, LLP

(57) ABSTRACT

The present invention provides a display device capable of realizing an appropriate screen display luminance in accordance with a video feature quantity and brightness around and sufficiently reducing power consumption. A liquid crystal display apparatus (1) includes: a liquid crystal panel (20) for displaying a video by an input video signal; a backlight unit (17) as a light source for irradiating the liquid crystal panel (20); and a brightness sensor (24) for detecting the brightness around the liquid crystal display apparatus (1). According to the brightness detected by the brightness sensor (24), luminance conversion characteristic defining the light emission luminance of the backlight for the feature quantity (such as APL) of the input video signal is changed. Here, the luminance conversion characteristic is changed so that the light emission luminance is reduced as the brightness around the liquid crystal display apparatus becomes darker and the position of the characteristic modification point as the point where the slope of the luminance conversion characteristic is changed is shifted in the direction of the feature quantity change. According to the obtained luminance conversion characteristic, the light emission luminance of the backlight is controlled.

9 Claims, 11 Drawing Sheets

U.S. PATENT DOCUMENTS

| | | | | |
|---|---|---|---|---|
| 5,760,760 A | * | 6/1998 | Helms | 345/102 |
| 5,952,992 A | * | 9/1999 | Helms | 345/102 |
| 2003/0146919 A1 | | 8/2003 | Kawashima et al. | |
| 2005/0017990 A1 | | 1/2005 | Yoshida | |

FOREIGN PATENT DOCUMENTS

| | | |
|---|---|---|
| JP | 63-015226 A | 1/1988 |
| JP | 5-127608 A | 5/1993 |
| JP | 11-327454 A | 11/1999 |
| JP | 2001-350134 A | 12/2001 |
| JP | 2002-357810 A | 12/2002 |
| JP | 2003-36063 A | 2/2003 |
| JP | 2004-177547 A | 6/2004 |
| JP | 2004-294767 A | 10/2004 |
| JP | 2004-354882 A | 12/2004 |
| WO | WO 2005/081212 A2 | 9/2005 |
| WO | WO 2005/093703 A1 | 10/2005 |

OTHER PUBLICATIONS

Supplementary European Search Report in corresponding European Application No. 06822776 mailed Aug. 23, 2010.

\* cited by examiner

FIG.13
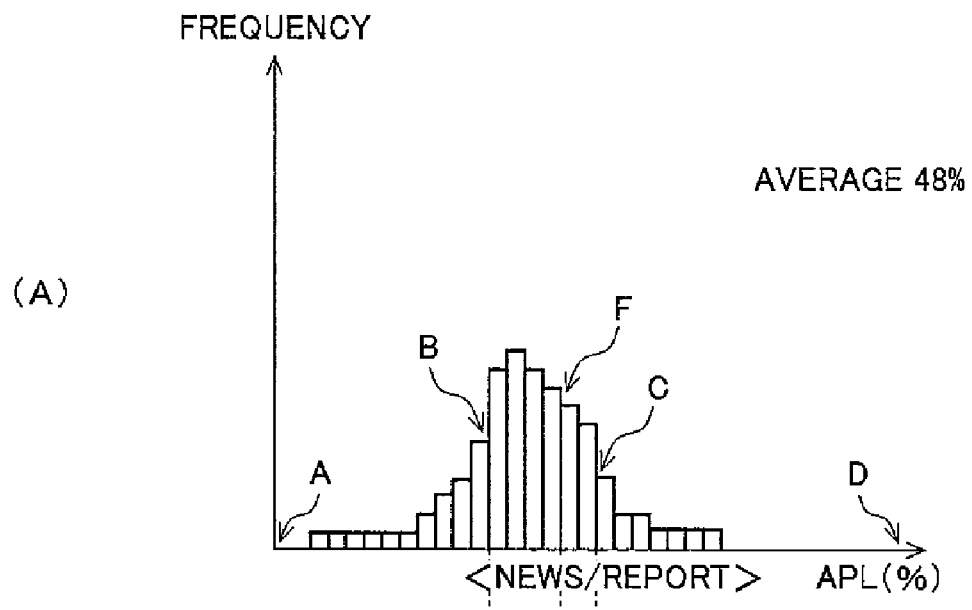
(A)
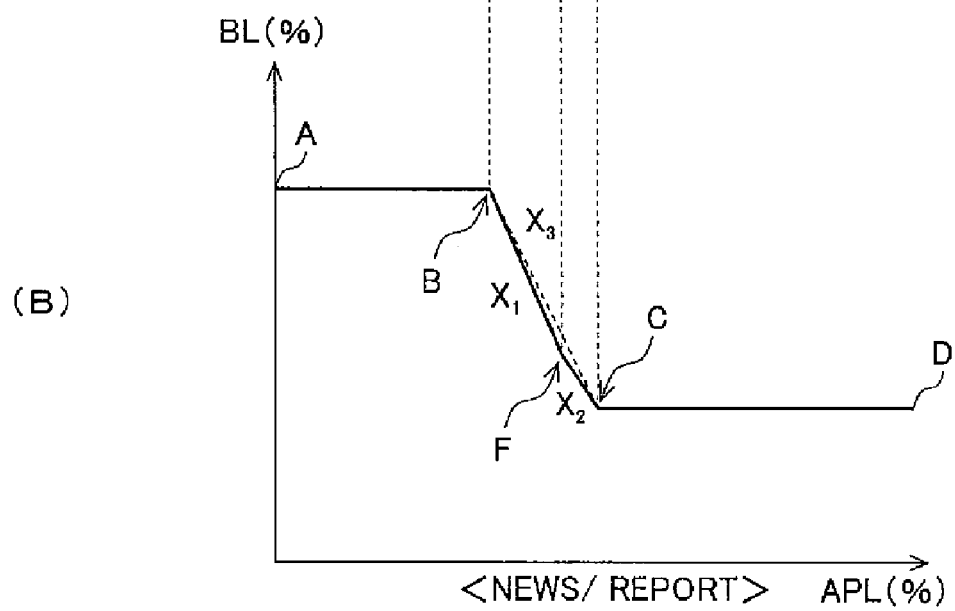
(B)

LIQUID CRYSTAL DISPLAY APPARATUS

TECHNICAL FIELD

The present invention relates to a liquid crystal display apparatus, and, more particularly, to a liquid crystal display apparatus that is adapted to properly display a video corresponding to the surrounding brightness and the content of the video displayed.

BACKGROUND OF THE INVENTION

For a liquid crystal display apparatus including: a liquid crystal panel that modulates a light beam from a light source according to a video signal; and a backlight unit to illuminate the liquid crystal panel, a technique is known according to which the emission luminance of the light source for the backlight is adapted to be controlled corresponding to the brightness around the liquid crystal display apparatus. In this case, the liquid crystal display apparatus includes a brightness sensor to detect the surrounding brightness, and the emission luminance of the backlight light source is controlled according to the brightness around the liquid crystal display apparatus detected by the brightness sensor. In this case, a visibility that can not be overwhelmed by the surrounding light can be obtained by, for example, brightening the emission luminance of the backlight light source following the brightness around the liquid crystal display when the surround becomes brighter.

In the description hereinafter, "contrast" refers to the difference in the brightness between the darkest portion and brightest portion in an image and "contrast feeling" refers to a vivid impression felt due to the difference in the brightness between the darkest portion and brightest portion in an image.

As to the above technique of controlling the display condition of a screen corresponding to the brightness around a display apparatus, for example, Patent Document 1 discloses an image display device that improves the visibility by increasing the brightness of an image thereon as suppressing the increase of the power consumption. According to this technique, the emission luminance of a backlight is adapted to be controlled using: a white display pixel number calculating portion that calculates the number of white display pixels using an image signal; an surrounding environment brightness detecting portion that detects the brightness of the surrounding environment; the number of white display pixel or the white display area that the above white display pixel number calculating portion has calculated; and the brightness of the surrounding environment that the above surrounding environment luminance detecting portion has detected.

The image display device of the above Patent Document 1 is adapted to provide images each having an excellent contrast suppressing the black portions therein to be lighted and, simultaneously, facilitate suppression of increase of the power consumption, by having stored in a data storing portion experimental data of the surrounding environment luminance and the emission intensity of the backlight obtained to the extent that black portions are not lighted.

The above image display device is provided with the surrounding environment brightness detecting portion that is a sensor capable of always monitoring the brightness of the surrounding environment (the surrounding environment brightness) and this portion controls the emission intensity of the backlight when all pixel display white and, simultaneously, controls the emission intensity of the backlight according to the magnitude of the image luminance. In this case, for a low-brightness display screen on which a small number of pixels display white, the entire screen is brightened by increasing the emission intensity of the backlight to the extent that the black level is not lighted. In contrast, for a bright screen on which a large number of pixels display white, power consumption saving can be facilitated and, simultaneously, a high-brightness display screen is retained by reducing the emission intensity of the backlight to a proper level. The emission intensity of the backlight is controlled using a method of controlling at least one of the backlight current, the emission pulse width (pulse duty), and the number of emission pulses.

For example, Patent Document 2 discloses a liquid crystal display apparatus that is adapted to execute a backlight control based on brightness information of a video, and brightness information around the liquid crystal panel. In this case, the liquid crystal display apparatus includes: a brightness detector to detect the brightness around the liquid crystal panel; and a means that executes the brightness control of the backlight based on the brightness around the liquid crystal panel detected by the brightness detector. For example, when the brightness around the liquid crystal panel becomes lower than a reference value, a dark video looks brighter than usual and, therefore, an inverter power circuit is controlled to reduce the brightness of the backlight (cold cathode tube). In contrast, when the brightness around the liquid crystal panel becomes higher than a reference value, a bright video looks darker than usual and, therefore, the inverter power circuit is controlled to increase the brightness of the backlight (cold cathode tube).

For example, Patent Document 3 discloses a projection type display device that adjusts the illuminance light quantity based on video information and optimally sets the range within which the light quantity adjusting is allowed (light attenuation range) thereof corresponding to the brightness of the viewing environment. In this case, the projection type display device includes a brightness detecting means of detecting the brightness of the viewing environment, and a means of setting the range within which the light quantity of the light source is attenuated based on the brightness of the viewing environment detected by the brightness detecting means. The attenuation light quantity of the light source is increased when the surround is bright, and the attenuation light quantity is reduced when the surround is dark and, thereby, the problem of under-brightness caused by excessive light quantity adjusting can be solved.

Patent Document 1: Japanese Laid-open Patent Publication No. 2004-294767

Patent Document 2: Japanese Laid-Open Patent Publication No. 2001-350134

Patent Document 3: Japanese Laid-Open Patent Publication No. 2004-354882

DISCLOSURE OF THE INVENTION

Problem to be Solved by the Invention

As above, according to the above Patent Document 1, the apparatus is provided with a brightness sensor that can always monitor the brightness of the surrounding environment of the apparatus and the apparatus is adapted to control the emission intensity of the backlight corresponding to the brightness of the surround thereof and to brighten the entire screen by increasing the emission intensity of the backlight to the extent that the black portions are not lighted for a low brightness display screen having a small number of pixels displaying white and, in contrast, to reduce the emission intensity of the backlight to a proper level for a bright screen having a large number of pixels displaying white.

As above, by controlling the emission luminance characteristic of the backlight corresponding to the brightness of the surrounding environment and the screen brightness such as the number of pixels displaying white, an image having a high luminance and an excellent contrast, that can not be influenced by the brightness of the surrounding environment is realized suppressing the increase of the power consumption. However, the emission intensity of the backlight can not be controlled according to the visual characteristics of human eyes such as suppression of the emission intensity that can not be recognized in terms of viewing, and fine suppression of the emission intensity with which the human eyes feel dazzle. Therefore, a problem has arisen that the apparatus in Patent Document 1 is incomplete in terms of realization of the optimal video display and reduction of the power consumption.

According to Patent Document 2, the brightness of the backlight (cold cathode tube) is reduced when the brightness around the liquid crystal panel becomes lower than a reference value and, in contrast, the brightness of the backlight is increased when the brightness around the liquid crystal panel becomes higher than a reference value and, thereby, the apparatus is adapted to obtain an image having contrast feeling. In addition, the contrast is increased increasing the brightness of the backlight when the average luminance of the image signal is high, and the contrast is increased reducing the brightness of the backlight when the average luminance of the image signal is low and, thereby, the apparatus is also adapted to obtain an image having contrast feeling.

However, Patent Document 2 has no detailed disclosure as to varying the luminance control quantity of the backlight based on the average luminance of the video signal and, similarly to Patent Document 1, the backlight emission intensity can not be controlled corresponding to the visual characteristics of the human eyes such as the suppression of the emission luminance that can not be recognized in terms of viewing and fine suppression of the emission luminance with which the human eyes feel dazzle and, therefore, a problem has arisen that the apparatus is incomplete in terms of the realization of the optimal video display and the reduction of the power consumption.

In addition, the apparatus of Patent Document 3 sets the light attenuation range from the highest emission luminance of the light source corresponding to the brightness of the surrounding environment and, as shown in FIG. 17, the area of a video feature quantity (histogram) that reduces the emission luminance of the light source is varied corresponding to the brightness of the surrounding environment. However, as to other areas, the emission luminance characteristic of the light source to the video feature quantity (histogram) is not varied. That is, when the feature quantity (histogram) of the input video signal is high, the luminance control characteristic of the light source to the feature quantity is not varied. Therefore, when the video feature quantity (histogram) is small, the effect of power consumption reduction by attenuating the light of the light source emission luminance can be obtained. However, a problem has arisen that, when other video feature quantity (histogram) is large, a sufficient effect of the power consumption reduction can not be obtained.

The present invention has been made considering the above situation and the object thereof is to provide a liquid crystal display apparatus including a backlight having a luminance control characteristic that can realize video display having the optical display quality and that can sufficiently suppress the power consumption thereof in the relation between the brightness variation around the liquid crystal display apparatus and the variation of the feature quantity in the video signal.

Means for Solving the Problems

In order to solve the above problems, a first technical means of the present invention is a liquid crystal display apparatus that has a liquid crystal panel that displays a video by an input video signal, a light source that illuminates the liquid crystal panel, and a brightness detecting means to detect the surrounding brightness; and the liquid crystal display apparatus is adapted to change the luminance control characteristic thereof that defines the emission luminance of the light source to at least one feature quantity concerning the brightness of the input video signal corresponding to the brightness detected by the brightness detecting means, wherein the emission luminance of the light source is reduced to the feature quantity corresponding to decrease of the brightness detected by the brightness detecting means, and wherein the position of a characteristic change point at which the slope of the luminance control characteristic is shifted in the direction along which the emission luminance of the light source is reduced and, simultaneously, is shifted in the direction along which a region of the feature quantity that provides the highest brightness as the emission luminance of the light source is reduced or in the direction along which a region of the feature quantity that provides the lowest brightness as the emission luminance of the light source is increased.

A second technical means of the present invention is a liquid crystal display apparatus that has a liquid crystal panel that displays a video by an input video signal, a light source that illuminates the liquid crystal panel, and a brightness detecting means to detect the surrounding brightness; and the liquid crystal display apparatus is adapted to change the luminance control characteristic thereof that defines the emission luminance of the light source to at least one feature quantity concerning the brightness of the input video signal corresponding to the brightness detected by the brightness detecting means, wherein a plurality of characteristic change points are present that each is point at which the slope of the luminance control characteristic is varied, and wherein corresponding to decrease of the brightness detected by the brightness detecting means, the positions of the plurality of characteristic change points are shifted in the direction along which the emission luminance of the light source is reduced and, simultaneously, is shifted in the direction along which a region of the feature quantity that provides the highest brightness as the emission luminance of the light source is reduced or in the direction along which a region of the feature quantity that provides the lowest brightness as the emission luminance of the light source is increased.

A third technical means of the present invention is the liquid crystal display apparatus as defined in the first technical means, wherein the characteristic change points are respectively intersections formed when the luminance control characteristics are approximated respectively by straight lines.

A fourth technical means of the present invention is the liquid crystal display apparatus as defined in the second technical means, wherein the characteristic change points are respectively intersections formed when the luminance control characteristics are approximated respectively by straight lines.

A fifth technical means of the present invention is a liquid crystal display apparatus that has a liquid crystal panel that displays a video by an input video signal, a light source that illuminates the liquid crystal panel, and a brightness detecting means to detect the surrounding brightness; and the liquid crystal display apparatus is adapted to change the luminance control characteristic thereof that defines the emission luminance of the light source to at least one a feature quantity concerning the brightness of the input video signal corresponding to the brightness detected by the brightness detecting means, wherein a region of the feature quantity with which the emission luminance of the light source is constant at the highest emission luminance regardless of the feature quantity or a region of the feature quantity with which the emission luminance of the light source is made lower than the highest emission luminance as the feature quantity becomes smaller in the luminance control characteristic is varied corresponding to the brightness detected by the brightness detecting means.

A sixth technical means of the present invention is the liquid crystal display apparatus as defined in the fifth technical means, wherein a region of the feature quantity is reduced as the brightness detected by the brightness detecting means becomes darker.

A seventh technical means of the present invention is the liquid crystal display apparatus as defined in any one of the first to sixth technical means, wherein the average luminance level for at least each one frame of the input video signal is used as the feature quantity.

An eighth technical means of the present invention is the liquid crystal display apparatus as defined in any one of the first to sixth technical means, wherein the input video signal is expanded, and wherein the emission luminance of the light source is controlled simultaneously with expansion.

A ninth technical means of the present invention is the liquid crystal display apparatus as defined in the seventh technical means, wherein the input video signal is expanded, and wherein the emission luminance of the light source is controlled simultaneously with expansion.

A tenth technical means of the present invention is the liquid crystal display apparatus as defined in any one of the first to sixth technical means, wherein a gradation conversion characteristic to the input video signal is varied, and wherein the emission luminance of the light source is controlled simultaneously with variation of the gradation.

An eleventh technical means of the present invention is the liquid crystal display apparatus as defined in the seventh technical means, wherein a gradation conversion characteristic to the input video signal is varied, and wherein the emission luminance of the light source is controlled simultaneously with variation of the gradation.

Effect of the Invention

According to the present invention, the emission luminance of the light source to a video feature quantity is varied corresponding to the brightness of the surrounding environment regardless of the magnitude of the video feature quantity, and the position is varied of the characteristic change point that is the point at which the slope of the luminance control characteristic is varied and, thereby, the excessive emission luminance of the light source can be reduced for any video and reduction of the power consumption can be more effectively executed. That is, even when the video feature quantity is large, the emission luminance to the video feature quantity is varied corresponding to the brightness of the surrounding environment and the range within which the emission luminance of the light source is reduced is widened such that the viewer does not feel dazzle and, thereby, there can be provided a liquid crystal display apparatus having a backlight light source emission luminance control characteristic that can realize video display having the optimal display quality and that can suppress the power consumption.

The present invention enables more effective power consumption reduction by having the plurality of characteristic change points that are the points at which the slope of the luminance control characteristic is varied and varying the positions of the plurality of characteristic change points corresponding to the brightness of the surrounding environment and, thereby, reducing the emission intensity of the light source not only in the range within which the video feature quantity is small but also in the range within which the video feature quantity is large such that the viewer does not feel dazzle.

According to the present invention, the attenuation quantity of the emission luminance of the light source can be optimally controlled in terms of the APL area that involves the element by varying the position of the characteristic change point that is a point at which the element constituting the luminance control characteristic and varying at least either of the constants "a" and "b" in the equation $y=ax+b$ (where $x$=feature quantity of the input video signal, $y$=emission luminance of the light source, and "a" and "b" are constants) expressing the element that closely approaches the characteristic change point and, therefore, the power consumption reduction can be effectively executed in both of the area within which the video feature quantity is small and the area within which the video feature quantity is large that involve both elements that closely approach sandwiching the characteristic change point.

BRIEF DESCRIPTION OF THE DRAWINGS

FIG. 13 is a diagram for explaining an example of the brightness conversion control in news/report genre.

Figure 1:
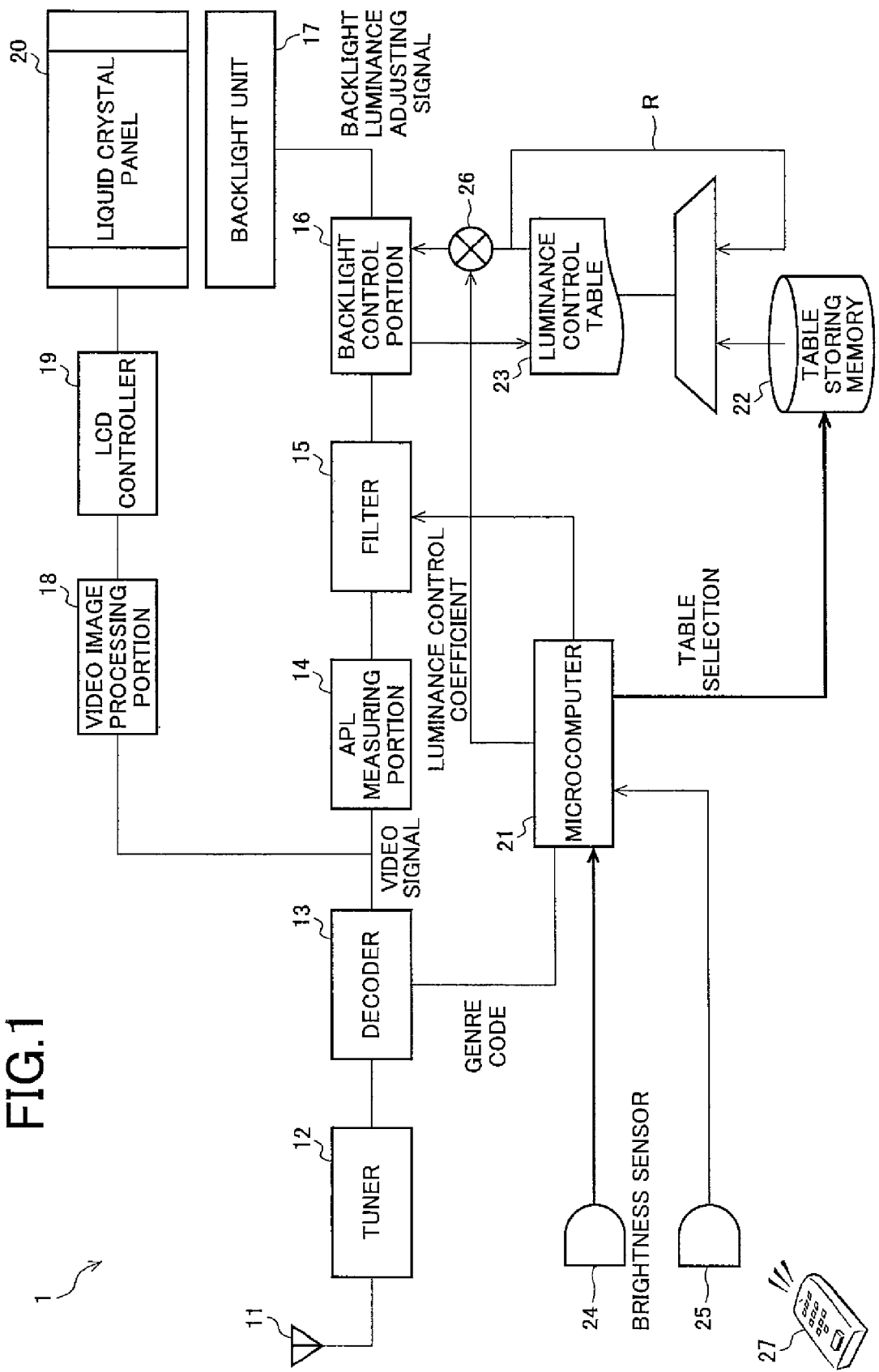
FIG. 1 is a block diagram for explaining the configuration of an embodiment of a liquid crystal display apparatus according to the present invention.

EXPLANATIONS OF REFERENCE NUMERALS 1 liquid crystal display apparatus, 11 antenna, 12 tuner, 13 decoder, 14 APL measuring portion, 16 backlight controlling portion, 17 backlight unit, 18 video processing portion, 19 LCD controller, 20 liquid crystal panel, 21 microcomputer, 22 table storing memory, 23 luminance control table, 24 brightness sensor, 25 remote control light-receiving portion, 26 multiplier, 27 remote control apparatus, 30 housing, 31 fluorescent tube, 32 diffuser, 41 red light source, 42 green light source, 43 blue light source.

PREFERRED EMBODIMENTS OF THE INVENTION

According to an embodiment of a liquid crystal display apparatus of the present invention, the average luminance level (APL: Average Picture Level) in one frame of an image signal is used as a feature quantity of the image signal. In addition, a luminance control table is retained to control the emission luminance of a backlight light source corresponding to variation of the APL.

The luminance control table is prepared in advance considering the brightness around the liquid crystal display apparatus, the brightness around the above apparatus is detected, the luminance control table to be used is selected according to the detection result, and the emission luminance of the backlight light source is controlled corresponding to the luminance control characteristic in the selected luminance control table.

FIG. 1 is a block diagram for explaining the configuration of an embodiment of a liquid crystal display apparatus according to the present invention. In a liquid crystal apparatus 1, a tuner 12 selects a broadcasting signal received from an antenna 11. A decoder 13 processes by decoding the broadcasting signal selected by the tuner 12 and outputs a video signal to drive a liquid crystal panel 20.

The video signal separated by the decoder 13 undergoes various video processes by a video processing portion 18 and, thereafter, is input into an LCD controller 19 that drives and controls the liquid crystal panel 20. The LCD controller 19 outputs a liquid crystal driving signal to a gate driver and a source driver both not shown of the liquid crystal panel 20 based on the input video signal and, thereby, a video according to the video signal is displayed on the liquid crystal panel 20.

The above video signal separated by the decoder 13 is also output to an APL measuring portion 14. The APL measuring portion 14 measures an APL for each one frame of the video signal output from the decoder 13. The measured APL is sent to a filter 15. The APL corresponds to one of video feature quantity of the present invention, and the emission luminance of the backlight light source is controlled corresponding to the APL based on the luminance control characteristic in the luminance control table described later.

Though the APL is measured using the video signal processed by decoding by the decoder 13 in the example shown in FIG. 1, the APL may be measured after the video processing by the video processing portion 18. However, the video processing portion 18 may execute a process to execute OSD (on-screen display) display, a scaling process, or a letter box display (limitation of the screen area using a black mask, etc.) process. In this case, when the APL is measured from the video signal that is output from the decoder 13 (that is, to which no video processing is executed by the video processing portion 18), control of the emission luminance of the backlight light source can be executed corresponding to the raw video signal without being influenced by these video processes. Therefore, it is more preferable to measure the APL from the video signal before any video process is executed to this signal as shown in FIG. 1.

The filter 15 defines the following property after the variation of the APL between frames when the emission luminance of the backlight light source is controlled corresponding to the measured value of the APL, the filter 15 is configured by, for example, a multi-stage digital filter.

The filter 15 is input with the APL for each frame measured by the APL measuring portion 14 and calculates an output APL by executing weighted average calculation to each frame according to the weighting of each APL between the APL(s) of one or more frame(s) in the past of the frame. In this case, the number of the past frame stages to reflect on the frame can be variably set, and weighting is set for each of the current frame and the past frames thereof (for the stages being set). The APL of the current frame and the APLs of delayed frames for the number of stages to be used are weighted-average calculated according to the weighting of each APL and the calculation result is output. Thereby, the following property of the output APL following the variation of the actual APL can be suitably set.

The APL output from the filter 15 is input into a backlight controlling portion 16. The backlight controlling portion 16 outputs a backlight luminance adjusting signal to adjust the emission luminance of the backlight light source corresponding to the input APL based on the selected luminance control table 23, and controls the emission luminance of the backlight light source unit 17.

Figure 2:
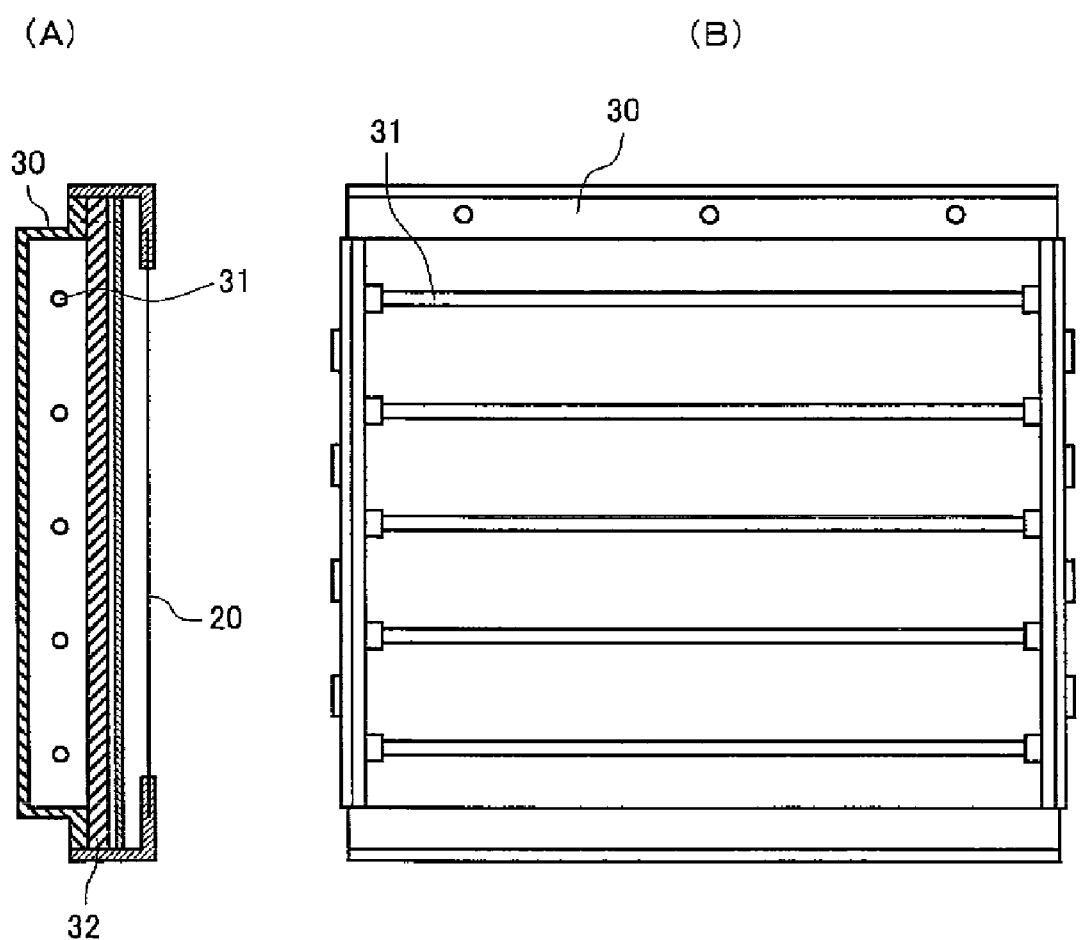
FIG. 2 is a diagram of an exemplary configuration of a backlight unit that can be applied to the liquid crystal display apparatus of the present invention.

The backlight unit 17 is configured, for example, as shown in FIG. 2, by disposing at regular intervals a plurality of fluorescent tubes 31 each in a thin tube shape in a housing 30 fitted on the back face of the liquid crystal panel 20. The illumination light emitted from the fluorescent tubes 31 is uniformly diffused by a diffuser 32. In this case, the backlight unit 17 includes, for example: a light attenuation control circuit that outputs as a light attenuating signal a pulse width modulating output of which the signal duration ratio (duty) of the high voltage level and the low voltage level of a rectangular wave varies according to the backlight brightness adjusting signal input from the backlight controlling portion 16; and an inverter that receives the light attenuating signal from the light attenuation control circuit, that generates a AC voltage having a cycle and a voltage according to the light attenuating signal, and that applies the AC voltage to the fluorescent tubes 31 and turns on and drives the tubes 31 (both not shown). The inverter executes intermittent operation thereof according to the output duty of the light attenuation control circuit by operating when the output of the light attenuation control circuit is at the high voltage level and stopping the operation thereof when the output is at the low voltage level and, thereby, the brightness of the light source is adjusted.

Figure 3:
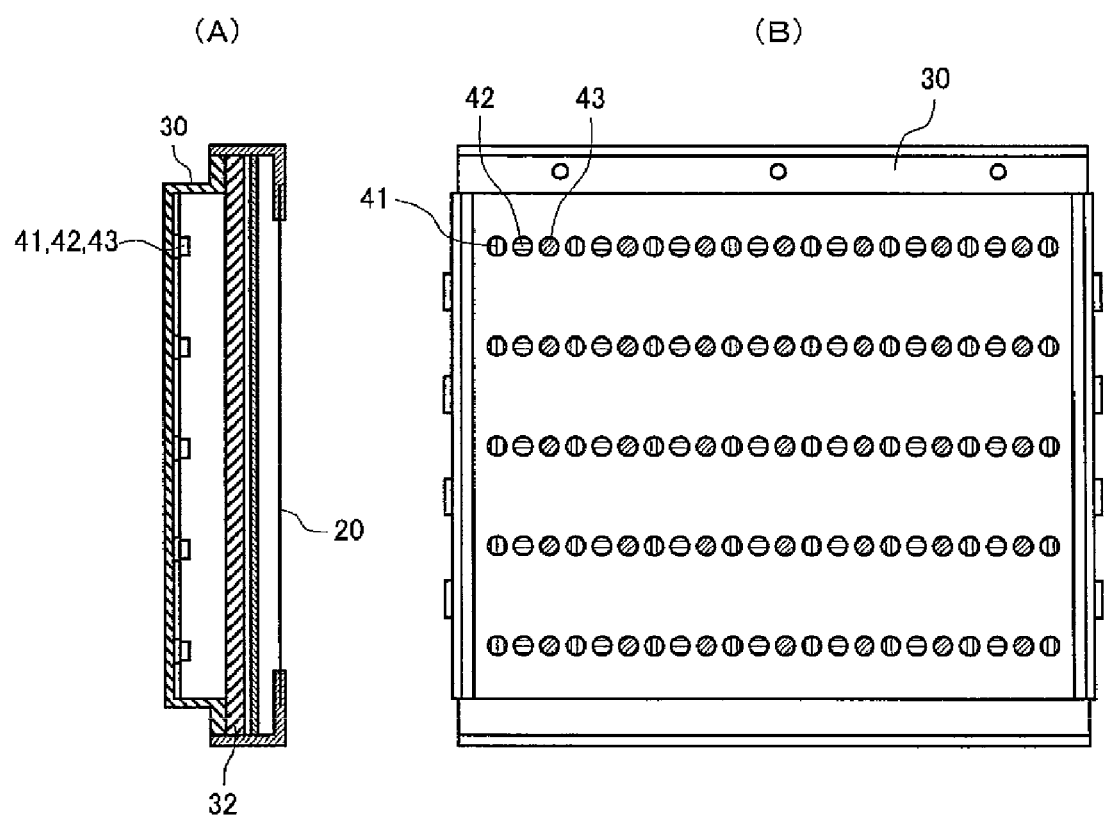
FIG. 3 is a diagram of another exemplary configuration of the backlight unit that can be applied to the liquid crystal display apparatus of the present invention.

As shown in FIG. 3, the backlight unit 17 may be configured by disposing LED light sources of a plurality of colors constituted of the three primary colors of red, green and blue, that is, red light sources 41, green light sources 42, and blue light sources 43 in the housing 30 fitted on the back face of the liquid crystal panel 20. The emission luminance of each LED light source can be controlled using an LED current to each LED light source.

Though not shown, a unit of a scheme according to which the above fluorescent tubes and LEDs are used in parallel can be applied as the backlight unit 17. In addition, the liquid crystal panel 20 may be illuminated by a configuration that causes the light from a light source such as a fluorescent tube or a LED to be uniform in a plane using a light guiding plate, that is, so-called a side-edge type configuration.

The liquid crystal display apparatus 1 includes a brightness sensor 24 as a brightness detecting means to detect the brightness around (the illuminance around) the liquid crystal display apparatus 1. For example, a photodiode can be applied as the brightness sensor 24. A DC voltage signal corresponding to the detected surrounding light is generated by the brightness sensor 24 and is output to a microcomputer 21. The microcomputer 21 outputs a control signal to select a luminance control table to be used in luminance adjusting of the backlight light source according to the DC voltage signal that corresponds to the surrounding light, or outputs a luminance adjusting coefficient to adjust a luminance control value of the luminance control table. Detailed examples of the brightness control of the backlight light source will be descried later.

The liquid crystal display apparatus 1 includes a remote control light-receiving portion 25 to receive a remote-control control signal transmitted from a remote control apparatus 27. The remote control light receiving portion 25 is configured by, for example, a light-receiving LED to receive the remote control operation signal in an infrared light beam.

The remote control operation signal received by the remote control light-receiving portion 25 is input into the microcomputer 21 and the microcomputer 21 executes predetermined control according to the input remote control operation signal.

In an embodiment of the liquid crystal display apparatus according to the present invention, the emission luminance of the backlight light source is controlled to optimize the display quality of the video displayed (brightness, contrast, liveliness, etc.) and the power consumption of the backlight light source, corresponding to the APL of the video signal measured by the APL measuring portion 14 and the brightness around the liquid crystal display apparatus measured using the brightness sensor 24.

In the embodiment of the present invention, luminance control tables stored in advance is used to control the emission luminance of the backlight light source, that corresponds to the brightness around the liquid crystal display apparatus. In the embodiment, for example, a plurality of luminance control tables (look-up tables) that correspond to the brightness around the liquid crystal display apparatus may be stored in a table storing memory 22 such as a ROM. The microcomputer 21 of the liquid crystal display apparatus 1 selects a luminance control table stored in the table storing memory 22 based on the brightness around the liquid crystal display apparatus measured by the brightness sensor 24, and sets the selected table as the luminance control table 23 to be used for emission luminance control of the backlight light source.

The luminance control table defines the relation of the emission luminance of the backlight light source that corresponds to the video feature quantity (herein, the APL) for each one frame of the input video signal. A plurality of luminance control tables that can be selected are prepared and retained in advance, and the luminance control table to be used for the control can be selected by, for example, designating the table number to be used corresponding to the brightness around the liquid crystal display apparatus.

In FIG. 1, the luminance adjusting coefficient output from the microcomputer 21 is used to execute brightness setting of the entire screen in response to a user operation. For example, a brightness adjusting item for the screen is set in a menu screen, etc., that the liquid crystal display apparatus 1 retains. The user can set the arbitrary brightness of the screen by operating the setting item. The microcomputer 21 of FIG. 1 recognizes the setting of the brightness and outputs the brightness adjusting coefficient to a multiplier 26 corresponding to the brightness being set. The multiplier 26 turns on the backlight light source at the brightness that corresponds to the setting of the brightness by multiplying the brightness adjusting coefficient to a brightness converting value according to the luminance control table currently used.

The brightness adjusting coefficient varies the slope of the luminance control characteristic of the luminance control table. That is, when a brightness adjusting coefficient that darkens the screen at a specific rate is used, the slope of the luminance control characteristic is varied to become smaller. When a brightness adjusting coefficient that brightens the screen is used, the slope of the luminance control characteristic becomes larger. However, a limiter works at the brightness of 100% of the backlight light source and the brightness is limited such that the brightness is not increased any more.

The above brightness adjusting coefficient is the control that is different from the change of the luminance control characteristic corresponding to the brightness around the liquid crystal display apparatus according to the present invention. The emission luminance of the backlight light source is controlled based on the luminance control table 23 selected from the luminance control tables stored in the table storing memory 22, and a luminance control characteristic value is multiplied by the brightness adjusting coefficient based on the user setting and the multiplication result is output to the backlight controlling portion 16.

Figure 4:
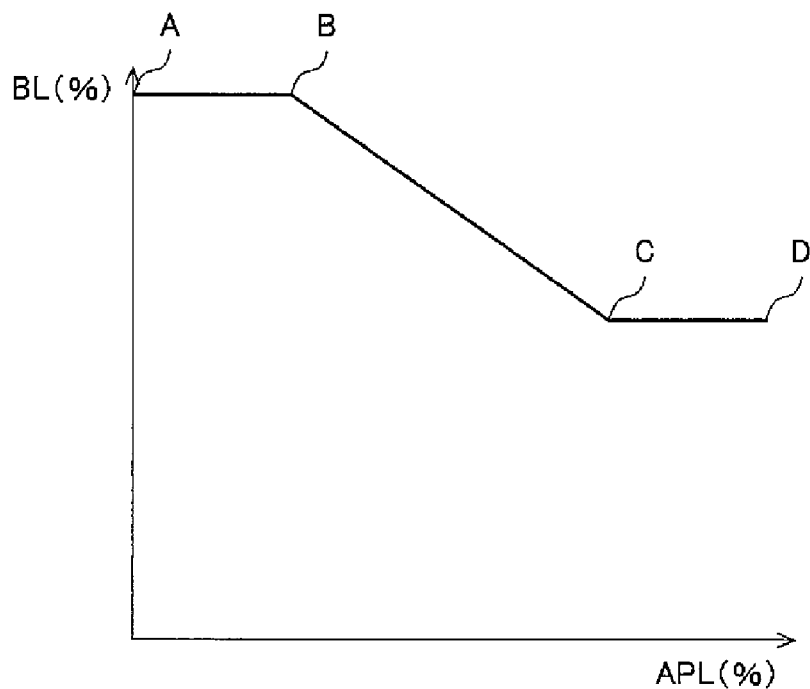
FIG. 4 is a diagram for explaining an exemplary control of the emission luminance of a backlight light source using a luminance control table.

FIG. 4 is a diagram for explaining an exemplary control of the emission luminance of a backlight light source using the luminance control table, and shows an example of the shape of the luminance control characteristic applied to the embodiment.

The axis of abscissa represents the APL in the percentage. Therefore, the APL becomes 0% when a displayed video is fully black on the entire screen and the APL becomes 100% when a video is fully white. The axis of ordinates represents the emission luminance of the backlight in the percentage. Therefore, the emission luminance shows 100% when the emission luminance of the backlight light source is made most brightened and the emission luminance shows 0% when the backlight light source is turned off.

FIG. 4 shows that the control characteristic of the backlight light source is changed corresponding to an area ("first APL area") shown by a section A-B and having a low APL, an area ("second APL area") shown by a section B-C and having an intermediate-level APL, and an area ("third APL area") shown by a section C-D and having a high APL.

For the first APL area (between A-B) having the low APL of the input video signal, the emission luminance of the backlight light source is set at a constant value at a high level.

Because the video is dark for the area having the low APL, the emission luminance of the backlight light source is set to be high and, thereby, the gray level expression of the dark portion in the video can be improved, peak portions in the dark screen can become conspicuous, and the video can be beautiful with contrast feeling. Furthermore, influences such as dazzle on the screen and stimulation to the eyes can be reduced.

For the third APL area (between C-D) having the high APL of the input video signal, the emission luminance of the backlight light source is set at a constant value at a low level, and influences to dazzle on the screen and stimulation to the eyes are reduced as much as possible.

Furthermore, for the second APL area that connects the above first APL area and the third APL area, the emission luminance of the backlight is controlled to be reduced corresponding to the increase of the APL with a predetermined level of slope. That is, the emission luminance of the backlight is varied to be reduced as the detected APL of the video signal becomes higher and, thereby, dazzle on the screen and stimulation to the eyes are reduced and the video is displayed at a proper brightness.

As above, for the first APL area (blacker side), the backlight is controlled to emit light at the highest luminance level in the luminance control characteristic and, for the third APL area (whiter side), the backlight light source is controlled to emit light at the lowest luminance level in the luminance control characteristic.

Furthermore, in this case, a point at which the slope of the emission luminance control characteristic of the backlight light source relative to the video feature quantity (in this example, the APL) is changed is defined as "characteristic change point". In FIG. 4, two intersections "B" and "C" of three straight lines "AB", "BC" and "CD" are the characteristic change points.

The luminance control characteristic that can be applied to the embodiment of the present invention is not limited to the above example and it is obvious that the characteristic can be property set corresponding to the emission characteristic and the power consumption of the backlight light source or the content of the video signal to be displayed, etc. In this case, the slope of the luminance control characteristic of each of the first to the third APL areas can arbitrarily be set and the number of the characteristic change points can arbitrarily be set.

Figure 5:
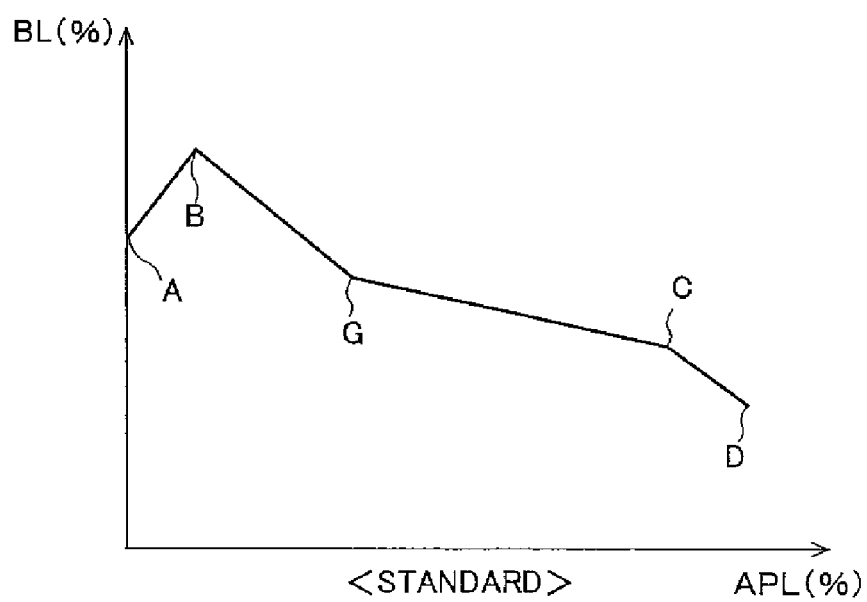
FIG. 5 is a diagram for explaining another exemplary control of the emission luminance of the backlight light source using a luminance control table.

FIG. 5 is a diagram for explaining another exemplary control of the emission luminance of the backlight light source using a luminance control table, and shows another example of the shape of the luminance control characteristic that can be applied to the embodiment.

In the example of FIG. 5, the control characteristic of the backlight light source is changed corresponding to an area having a low APL shown by a section A-B (first APL area), an area having an intermediate APL shown by a section B-C (second APL area), and an area having a high APL shown by a section C-D (third APL area), and a characteristic change point G is further provided for the second APL area of the intermediate level and, thereby, the slope of the luminance control characteristic is changed.

The luminance control characteristic of FIG. 5 is set being intended to facilitate further low power consumption of the backlight light source maintaining the image quality of the video to be displayed. For example, the characteristic change point B that is present at a position with the lowest APL in the luminance control characteristic of the example is set at a position at which the APL is 10%, and the characteristic change point C that is present at a position with the highest APL is set at a position at which the APL is 90%. The characteristic change point B with the lowest APL is set as a characteristic change point with which the emission luminance of the backlight becomes the maximum.

95% or more of a broadcasted video signal falls on a signal area with which the APL is 10% to 90%. In this signal area, similarly to the above conventional technique, the apparatus is adapted such that the emission luminance of the light source is increased for a lower APL value (around 10%) and, thereby, the contrast feeling can be increased, and the emission luminance of the light source is reduced for a higher APL value (around 90%) and, thereby, undesired dazzle feeling can be reduced.

That is, for the signal area with the APL being 10% to 90% (area B-C), the emission luminance of the backlight light source is reduced as the APL becomes larger. In this area, a characteristic change point p2 is further set and, thereby, the rate of variation is changed.

For the signal area with which the APL is very low and is 0% to 10% (area A-D), the emission luminance is reduced as the APL becomes smaller from the characteristic change point B of the highest luminance of the backlight light source.

For the signal area with which the APL is extremely high and is 90% to 100% (area C-D), the emission luminance of the backlight light source is reduced as the APL further becomes larger.

For the signal area with which the APL is extremely high and is 90% to 100%, the video signal itself has sufficient luminance and brightening the backlight light source makes no sense. Rather, the screen is felt to be dazzling and, thereby, the eyes of a viewer may be adversely influenced. Therefore, for this signal area, the rate of the variation of the emission luminance of the backlight light source to the APL is made larger than the rate of variation of that to the APL for the signal area with which the APL is 10% to 90% and, thereby, the emission luminance of the backlight light source can be further reduced.

As to the above luminance control characteristic, for example, for a CRT (Cathode-Ray Tube) that is a typical displaying means, when the APL exceeds about 50%, the CRT has a characteristic of reducing the luminance of the screen thereof with the increase of the APL.

According to the above luminance control characteristic, the emission luminance of the backlight light source is adapted to be reduced corresponding to the increase of the APL for the signal area (area C-D) with which the APL is high. Because this follows the luminance characteristic of the CRT, nothing strange on viewing is felt and the gradation of the image quality is a little.

It is obvious that the luminance control characteristics that occupy the above examples may be not only linear as above but also non-linear characteristics. When the luminance control characteristic is non-linear, the non-linear luminance control characteristic is approximated to a linear luminance control characteristic and changed characteristic points are assumed in the approximated linear luminance control characteristic and, thereby, APL areas can be assumed similarly to the above linear luminance control characteristic.

Figure 6:
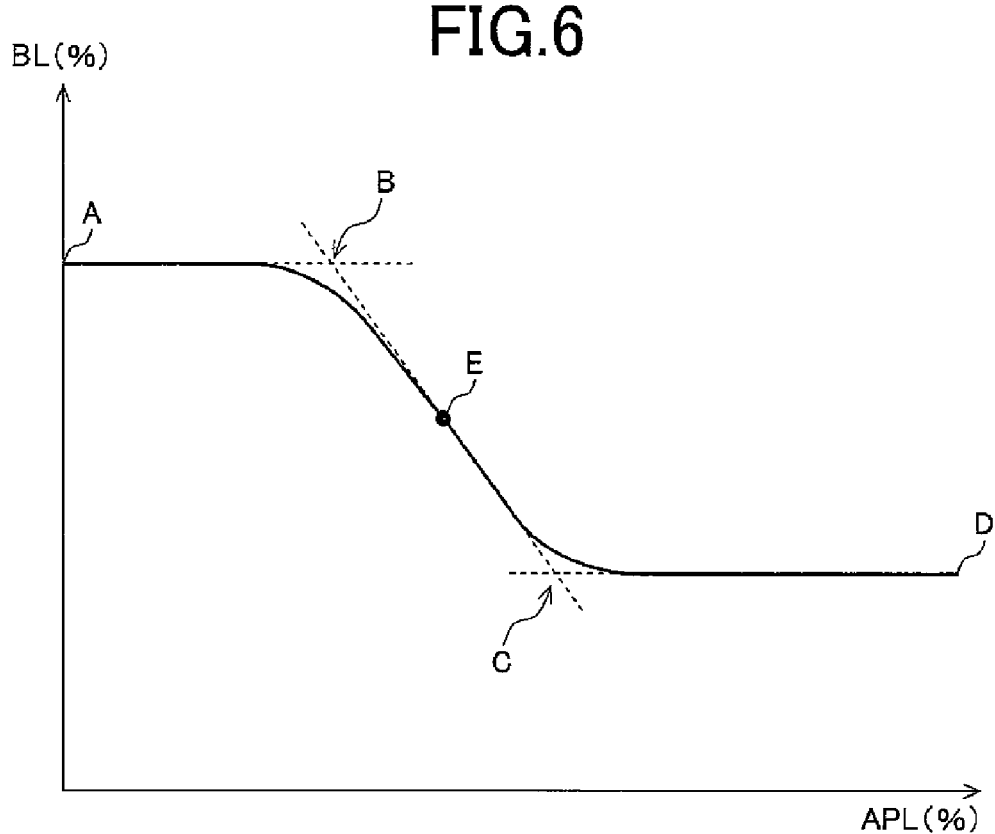
FIG. 6 is a diagram for explaining yet another exemplary control of the emission luminance of the backlight light source using a luminance control table.

For example, in the case where the luminance control characteristic is a non-linear characteristic as shown in FIG. 6, when this non-linear characteristic is approximated to a straight line, this non-linear characteristic can be approximated by three straight lines AB, BC and CD as shown by dotted lines of FIG. 6 in a simplified case. These three straight lines can be defined by a straight line indicating that the APL is low and the emission luminance is increased (first APL area), a straight line indicating that the APL is high and the emission luminance is reduced (third APL area), a straight line between the above two that is obtained by approximating the non-linear curved line that indicate that the emission luminance of the backlight light source is varied corresponding to the APL, with a single sloped line (second APL area). In this case, the straight line in the second APL area is defined by, for example, the slope at a point of inflection E of the non-linear curved line.

In this manner, by approximating a non-linear luminance control characteristic with a straight line, the intersections B and C of the three straight lines can be defined as characteristic change points.

Similarly to a linear luminance control characteristic, the number of straight lines that are used for the approximation is not limited to three, and four or more straight line may be used. For example, when four straight lines approximate, three characteristic change points are present.

Description will be given below for a luminance control table to change the luminance control characteristic of the backlight light source corresponding to the brightness around the liquid crystal display apparatus.

Figure 7:
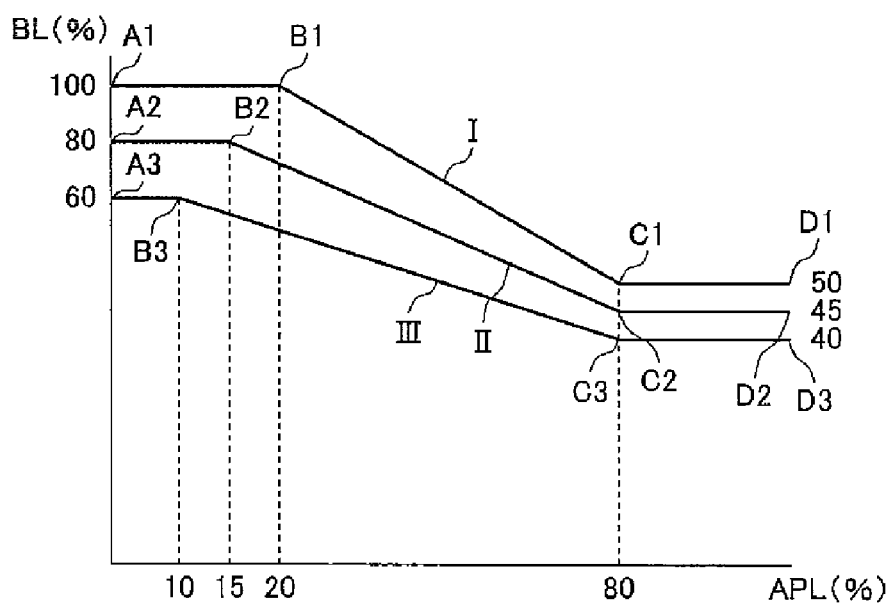
FIG. 7 is a diagram for explaining an example of the luminance control characteristic by the luminance control table selected corresponding to the brightness around the liquid crystal display apparatus.

FIG. 7 is a diagram for explaining an example of the luminance control characteristic by a luminance control table selected corresponding to the brightness around the liquid crystal display apparatus.

In the example, a plurality of the luminance control tables corresponding to the brightness around the liquid crystal display apparatus are retained in the table storing memory 22. The microcomputer 21 of the liquid crystal display apparatus selects a luminance control table based on the brightness around the liquid crystal display apparatus measured using the brightness sensor 24, and controls the emission luminance of the backlight light source using the selected luminance control table.

The luminance control characteristic of each of the above plurality of luminance control tables is set as in FIG. 7. The example of FIG. 7 sets a luminance control characteristic for each of, for example, three stages for the situation where the surround of the liquid crystal display apparatus is bright (for example, when the illuminance of the panel face of the liquid crystal panel is 100 lux or more) (I), where the surround is somewhat dark (for example, when the above illuminance is about 50 lux) (II), and where the surround is dark (for example, when the above illuminance is 10 lux or less) (III).

Each of the luminance control characteristics is set based on the idea of the exemplary luminance control characteristic shown in the above FIG. 4.

In this case, basically, the emission luminance of the backlight is reduced as the surround of the liquid crystal apparatus becomes darker.

When the surround of the liquid crystal display apparatus is a bright viewing environment, the display screen of the liquid crystal display apparatus needs to also be bright. Whether the display screen is felt to be dazzling varies depending on the surrounding environment. Considering this, for the signal area having a high APL (whiter side) for which dazzle is felt, the emission luminance of the backlight light source is reduced as the surrounding environment becomes darker. However, because the emission luminance for the bright surround is set to be low, the reduction rate is also set to be small.

When the backlight is always turned on at constant emission intensity, though the contrast ratio (CR) in a bright viewing environment is high, the contrast ratio is reduced in a dark viewing environment because so-called lighted black portions are visually recognized. The lighted black portion is a phenomenon that only a slight portion of the light of the backlight light source penetrates the liquid crystal panel even when a black screen is displayed, and the influence thereof becomes enhanced in a dark viewing environment. Therefore, considering this, for the low-APL signal area (blacker side) that provides strong influence of lighted black portions, the rate of reducing the emission luminance of the backlight light source as the surrounding environment becomes darker is increased compared to that of the high-APL area (whiter side).

As above, considering the different characteristics due to the "dazzle" and the "contrast feeling" of the display screen, the high-APL area and the low-APL area are controlled corresponding to the brightness of the surround. Therefore, control by shifting the luminance control characteristic corresponding to the brightness is not set but the luminance control characteristics are set based on the following idea.

In the example of FIG. 7, as above, a luminance control characteristic (I) for the situation where the surround of the liquid crystal display apparatus is bright, a luminance control characteristic (II) for the situation where the surround is somewhat dark, and the luminance control characteristic (III) for the situation where the surround is dark is set.

The embodiment is characterized in that, for each of the luminance control characteristics (I) to (III), the positions of the above characteristic changing points are changed in the APL direction and, thereby, each luminance control characteristic can be optimized for each surrounding environment.

In this case, each luminance control characteristic basically has the low-APL first area on the blacker side, the intermediate-level-APL second area, and the high-APL third area on the whiter side.

For the low-APL first APL area, the luminance control characteristic is set to be a straight line. This straight line section indicates the highest luminance level in the luminance control characteristics. In this example, the highest luminance level in the first APL area is reduced as the surround of the liquid crystal display apparatus becomes darker and, simultaneously, the position of the characteristic change point that defines the range of the highest luminance level is shifted toward the low-APL side (blacker side). That is, the characteristic change point B2 of the luminance control characteristic (II) is shifted toward the low-APL side relative to the characteristic change point B1 of the luminance control characteristic (I) and, in addition, the characteristic change point B3 of the luminance control characteristic (III) is shifted toward the low-APL side.

Generally, in the visual characteristic of the human, when the surrounding environment is dark, the contrast feeling is relatively enhanced. That is, even when the luminance of the backlight is reduced as the surrounding environment becomes darker, the APL area with which sufficient contrast feeling can be felt is extended toward the low-APL side and the APL area with which the sufficient contrast feeling can not be obtained is limited to a narrow area on the low-APL side. Therefore, for the APL area having a higher APL than that of the narrow area on the low-APL side, the luminance of the backlight is excessive and, when the excessive luminance of the backlight is reduced, the sufficient contrast feeling can also be obtained.

That is, in the above example, the emission luminance level of the backlight light source is reduced as the surrounding environment of the liquid crystal display apparatus becomes darker and, simultaneously, the position B of the characteristic change point is shifted toward the low-APL side from B1 to B3 and, thereby, the range of the first APL area in the APL direction that provides the highest luminance level is reduced. In this case, it is assumed that the range of the first APL area that provides the highest luminance level is an APL area with which the sufficient contrast feeling can not be obtained when the luminance of the backlight is reduced. Because the luminance of the backlight is excessive on the high-APL side that exceeds this range, the emission luminance of the light source is gradually reduced.

In this manner, the emission luminance of the first APL area on the blacker side having the highest luminance level is reduced as the surrounding environment becomes darker and, during this, the position in the APL direction of the character changing point that defines the first APL area is shifted toward the low-APL side and, thereby, the area with which the emission is at the highest luminance thereof is reduced. Therefore, the excessive emission can be suppressed for the human to obtain for the sufficient contrast feeling and the power consumption of the backlight light source can be reduced.

The change of the luminance control characteristic corresponding to the surrounding brightness has been described with the change of the position of the characteristic change points. However, this can be described as below. That is, a luminance control characteristic is constituted of a plurality of elements each directly or approximately expressed by an equation y=ax+b (where x=feature quantity of the input video signal, y=emission luminance of the light source, and "a" and "b"=constants), and the positions of the characteristic change points are changed and at least one of the constants a and b in the equation expressing the elements that closely approaches to the characteristic change points is varied and, thereby, the change of the luminance control characteristic may be executed. Description will be given for this.

In the example of FIG. 7, a section of a straight-line luminance control characteristic indicated by A1-B1, etc., is defined as an element. That is, the luminance control characteristic (I) is constituted of three straight-line luminance control characteristic sections of the one between A1-B1, the one between B1-C1 and the one between C1-D1, and therefore, is constituted of three elements. The section between A1-B1 is denoted by "element 1". The section between B1-C1 is denoted by "element 2". The section between C1-D1 is denoted by "element 3". Each of the elements can be expressed by an equation y=ax+b (where x=feature quantity of the input video signal, y=emission luminance of the light source and "a" and "b"=constants). However, the characteristic of FIG. 7 is set based on the idea of the luminance control characteristic shown in FIG. 4 and, therefore, the element 1 and the element 3 each have a constant emission luminance. Therefore, the equation for each element can be expressed as the element 1: y=b1, the element 2: y=a2x+b2 and the element 3: y=b3.

When the characteristic is changed from the luminance control characteristic (I) to the luminance control characteristic (II), noting the characteristic change points B1 and B2, the characteristic change point B2 of the luminance control characteristic (II) is shifted toward the low-emission luminance side and the low-APL side relative to the characteristic change point B1 of the luminance control characteristic (I). Simultaneously, the constant b1 in the equation expressing the element 1 that is one of the elements closely approaching the characteristic change point B1 is changed to a value that is lower than b1 (denoted by "b1'"). The constant a2 in the equation expressing the element 2 that is the other element closely approaching the characteristic change point B1 is changed to a somewhat lower value than itself (denoted by "a2'") and the constant b2 in the same equation is changed to a value that is lower than b2 (denoted by "b2'").

For example, when it is more preferable in terms of suppressing excessive emission that the emission luminance is somewhat reduced in the low-APT direction for the element 1 of the luminance control characteristic (II), a more preferable characteristic can be set by changing the equation of the element 1 of the luminance control characteristic (II) from Y=b1' to Y=a1'x+b1'' (a1'>0, b1''<b1'). When it is more preferable in terms of suppressing excessive emission that the element 2 of the luminance control characteristic (II) is somewhat reduced in the high-APL direction in terms of emission luminance, a more preferable characteristic can be set by changing the equation of the element 2 of the luminance control characteristic (II) from y=a2'x+b2' to y=a2''x+b2'' (a2''<a2', b2''>b2').

In this manner, more meticulous control can be executed by executing the change of the luminance control characteristic that is executed according to the surrounding brightness by changing at least one of the constants a and b in the equation of a straight line indicating an element that closely approaches the characteristic change points, in addition to changing the characteristic change points. Therefore, the power consumption of the backlight light source can be more reduced.

In the luminance control characteristic of FIG. 7, for the third APL area having the lowest luminance level and the second APL area connecting the first and the third APL areas, the emission luminance of the backlight is also reduced as the surrounding environment becomes darker. In this case, the quantity to be reduced of the emission luminance for the third APL area is set to be smaller than the quantity to be reduced of the emission luminance for the first APL area. Therefore, the slope of the luminance control characteristic of the second APL area becomes smaller as the surrounding environment becomes darker.

In this case, in the example of FIG. 7, the positions in the APL direction of the characteristic change points C1, C2 and C3 at which the characteristic changes from the second APL area to the third APL area are not changed and are set at the same positions. In this case, when luminance control considering the visual characteristic of the human for the high-APL area on the whiter side is executed, for example, control as in FIG. 8 shown below may be executed.

Figure 8:
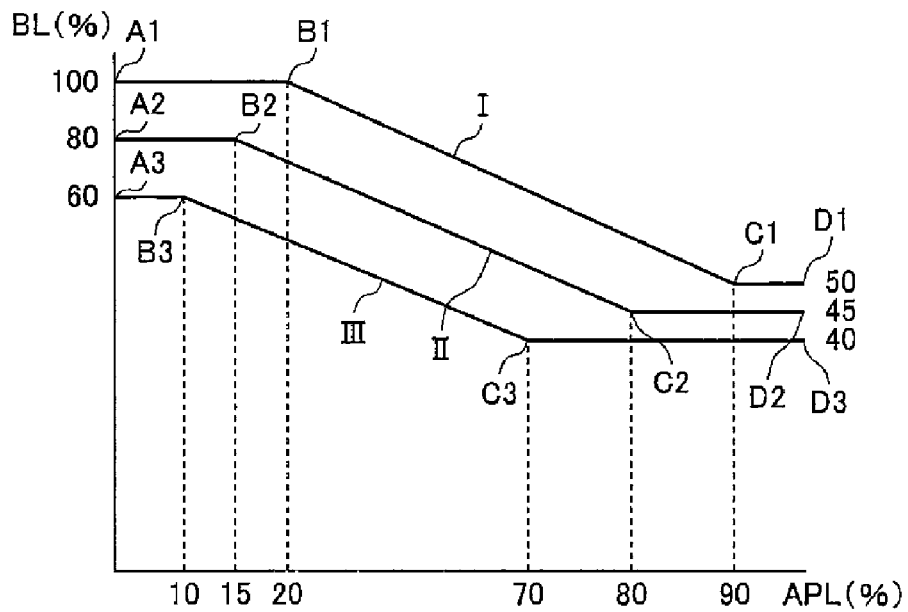
FIG. 8 is a diagram for explaining another example of the luminance control characteristic by the luminance control table selected corresponding to the brightness around the liquid crystal display apparatus.

FIG. 8 is a diagram for explaining another example of the luminance control characteristic by the luminance control table selected corresponding to the brightness around the liquid crystal display apparatus.

Compared to the above example of FIG. 7, in the exemplary control of FIG. 8, the characteristic change points C1, C2 and C3 at which the characteristic changes from the second APL area to the third APL area are shifted toward the low-APL side as the surrounding environment becomes darker.

Generally, in the visual characteristic of the human, when the surrounding environment is dark, the APL area with which the human feels relatively dazzle is widened. That is, the APL area with which a human viewing the screen feels dazzle relatively is widened from the high-APL side to the low-APL side as the surrounding environment becomes darker and, for a lower area, the human feels almost no dazzle even when the luminance of the backlight is high.

That is, in the above example, the position C of the characteristic change point is shifted toward the low-APL side from C1 to C3 and, thereby, the range in the APL direction of the third APL area that provides the lowest luminance level is made larger as the surround of the liquid crystal display apparatus becomes darker. In this case, it is assumed that the range of the third APL area that provides the lowest luminance level is a range with which the human feels dazzle. On the low-APL side that exceeds this range, the emission luminance of the backlight is gradually increased toward the first APL area.

In this manner, the emission luminance for the third APL area on the whiter side having the lowest luminance level is reduced as the surround of the liquid crystal display apparatus becomes darker and, at this time, the position in the APL direction of the characteristic change point that defines the third APL area is shifted toward the low-APL side and, thereby, the signal area for which emission is executed at the lowest luminance is widened. Therefore, emission for the signal area with which the human feels dazzle can be suppressed and the power consumption of the backlight can be reduced.

Figure 9:
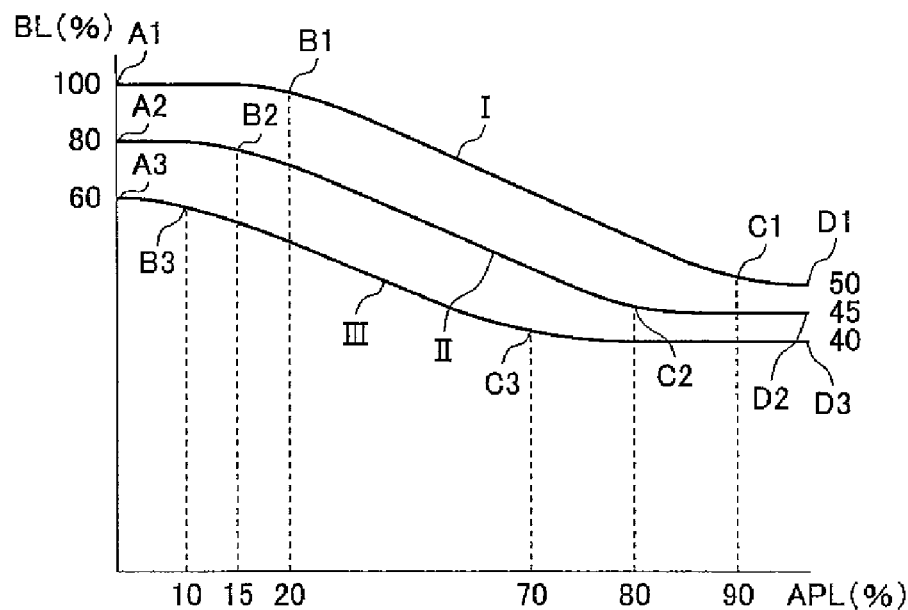
FIG. 9 is a diagram for explaining yet another example of the luminance control characteristic by the luminance control table selected corresponding to the brightness around the liquid crystal display apparatus.

FIG. 9 is a diagram for explaining yet another example of the luminance control characteristic by the luminance control table selected corresponding to the brightness around the liquid crystal display apparatus. But the linear luminance control characteristic shown in the above FIGS. 7 and 8 is not shown in FIG. 9, but FIG. 9 shows an exemplary setting of a non-linear luminance control characteristic.

As above, when the luminance control characteristic is not linear, the non-linear luminance control characteristic is approximated to a linear luminance control characteristic and characteristic change points in the luminance control characteristic having the approximated line shape are assumed. Thereby, the APL areas can be defined similarly to the linear luminance control characteristic.

In the example of FIG. 9, the luminance control characteristic (I) for the situation where the surround of the liquid crystal display apparatus is bright, the luminance control characteristic (II) for the situation where the surround is somewhat dark and the luminance control characteristic (III) for the situation where the surround is dark is set respectively as non-linear luminance control characteristics. In each of the luminance control characteristic, the characteristic change points B1 to B3 and C1 to C3 are defined from the straight lines that approximate the non-linear characteristics. Though these approximated straight lines are not shown, the characteristic change points B1 to B3 and C1 to C3 are defined by assuming approximated straight lines using the approach as in the above FIG. 6. In FIG. 9, to avoid complication of the figure, the vicinity of each intersection of the above approximated straight lines is shown as a characteristic change point for convenience.

Similarly to the example of FIG. 8, in the example of FIG. 9, the characteristic change points B1 to B3 at which the characteristic shifts from the first APL area to the second APL area and the characteristic change points C1 to C3 at which the characteristic shifts from the second APL area to the third APL area are shifted toward the low-APL side as the surrounding environment becomes darker. Thereby, the contrast feeling that is mainly influenced by the low-APL area and the dazzle feeling that is mainly influenced by the high-APL area are controlled and, thereby, the screen display can be optimized and the power consumption of the backlight light source can be reduced.

For the non-linear luminance control characteristic as FIG. 9, the setting may be made such that the positions of the characteristic change points B1 to B3 are shifted toward the low-APL side and the positions in the APL direction of the characteristic change points C1 to C3 are not changed as the surrounding environment of the liquid crystal display apparatus becomes darker as FIG. 7. Otherwise, the setting may be made such that the positions of the characteristic change points C1 to C3 are shifted toward the low-APL side and the positions in the APL direction of the characteristic change points B1 to B3 are not changed as the surrounding environment of the liquid crystal display apparatus becomes darker.

As above, in the embodiment of FIGS. 7 to 9, the emission luminance of the backlight light source is varied corresponding to the brightness detected by the brightness detecting means and, in the luminance control characteristic, the area with which the emission luminance of the backlight light source becomes constant at the highest emission luminance regardless of the feature quantity of the input video signal is varied.

Figure 10:
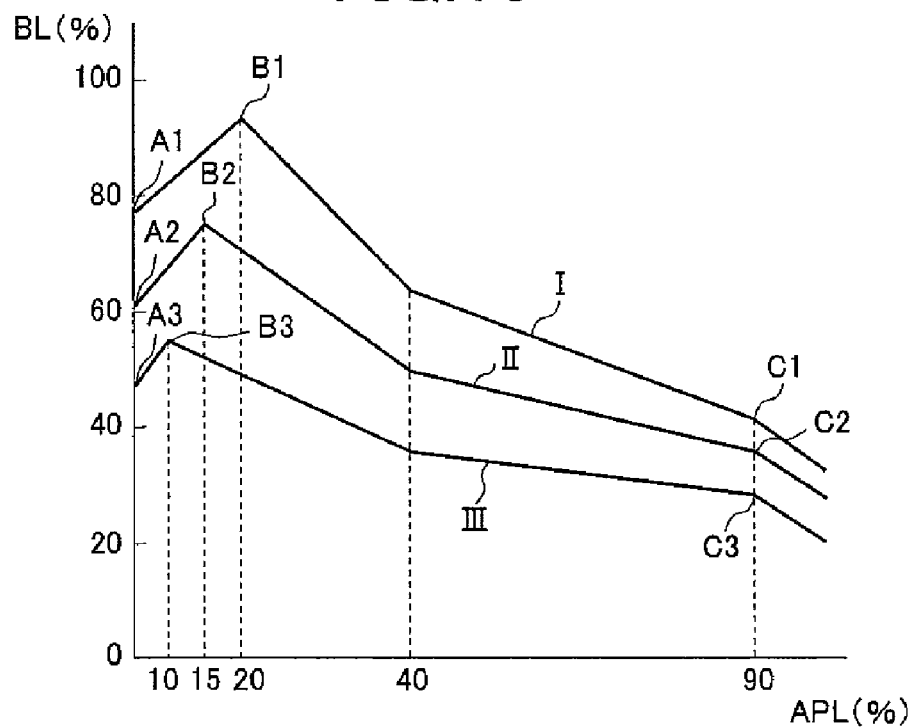
FIG. 10 is a diagram for explaining yet another example of the luminance control characteristic by the luminance control table selected corresponding to the brightness around the liquid crystal display apparatus.

FIG. 10 is a diagram for explaining yet another example of the luminance control characteristic by the luminance control table selected corresponding to the brightness around the liquid crystal display apparatus.

In the above examples of FIGS. 7 to 9, the plurality of luminance control characteristics are set based on the shape of the standard luminance control characteristic shown in FIG. 4. In this example and examples of FIGS. 11 and 12 described later, a plurality of luminance control characteristics are set based on the characteristic of the luminance control characteristic shown in FIG. 5.

The luminance control characteristic shown in FIG. 10 is prepared to the same effect of the above luminance control characteristic of FIG. 7. That is, in the luminance control characteristic of this example, a luminance control characteristics is also set for each of the three stages of the situation where the surround of the liquid crystal display apparatus is bright (I), the situation where the surround is somewhat dark (II) and the situation where the surround is dark (III).

The emission luminance of the backlight light source is reduced as the surround of the liquid crystal display apparatus becomes darker. In the embodiment, in each of the luminance control characteristics (I) to (III), the position of the characteristic change point B including the highest emission luminance is changed in the APL direction and, thereby, the luminance control characteristic is optimized for each surrounding environment.

In this case, the luminance level for the first APL area is reduced and, simultaneously, the position of the characteristic change point that defines the range of the highest luminance level is shifted toward the low-APL side (blacker side) as the surround of the liquid crystal display apparatus becomes darker. That is, the characteristic change point B2 of the luminance control characteristic (II) is shifted toward the low-APL side relative to the characteristic change point B1 of the luminance control characteristic (I) and the characteristic change point B3 of the luminance control characteristic (III) is shifted further toward the low-APL side.

That is, in this example, the emission luminance level of the backlight light source is reduced as the surrounding environment of the liquid crystal display apparatus becomes darker and, simultaneously, the position of the characteristic change point B is shifted toward the low-APL side from B1 to B3 and, thereby, the range of the first APL area in the APL direction that provides the highest luminance level is reduced. In the range of the first APL area that provides the highest luminance level, the position of the characteristic change point B is shifted toward the low-APL side as the surrounding environment becomes darker considering that the area with which the human feels contrast is varied corresponding to the surrounding environment.

In this manner, the emission luminance of the first APL area on the blacker side having the highest luminance level is reduced as the surrounding environment becomes darker and, at this time, the position in the APL direction of the character changing point that defines the first APL area is shifted toward the low-APL side and, thereby, extra emission for the area with which the human does not feel the contrast feeling can be suppressed and the power consumption of the backlight light source can be reduced.

In the luminance control characteristic of FIG. 10, for the third APL area having the lowest luminance level and the second APL area connecting the first and the third APL areas, the emission luminance of the backlight light source is also reduced as the surrounding environment becomes darker. In this case, the quantity to be reduced of the emission luminance for the third APL area is set to be smaller than the quantity to be reduced of the emission luminance for the first APL area. Therefore, the slope of the luminance control characteristic of the second APL area becomes smaller as the surrounding environment becomes darker.

In this case, in the example of FIG. 10, the positions in the APL direction of the characteristic change points C1, C2 and C3 at which the characteristic changes from the second APL area to the third APL area are not changed and are set at the same positions. In this case, when luminance control considering the visual characteristic of the human for the high-APL area on the whiter side is executed, for example, control as in FIG. 11 shown below may be executed.

Figure 11:
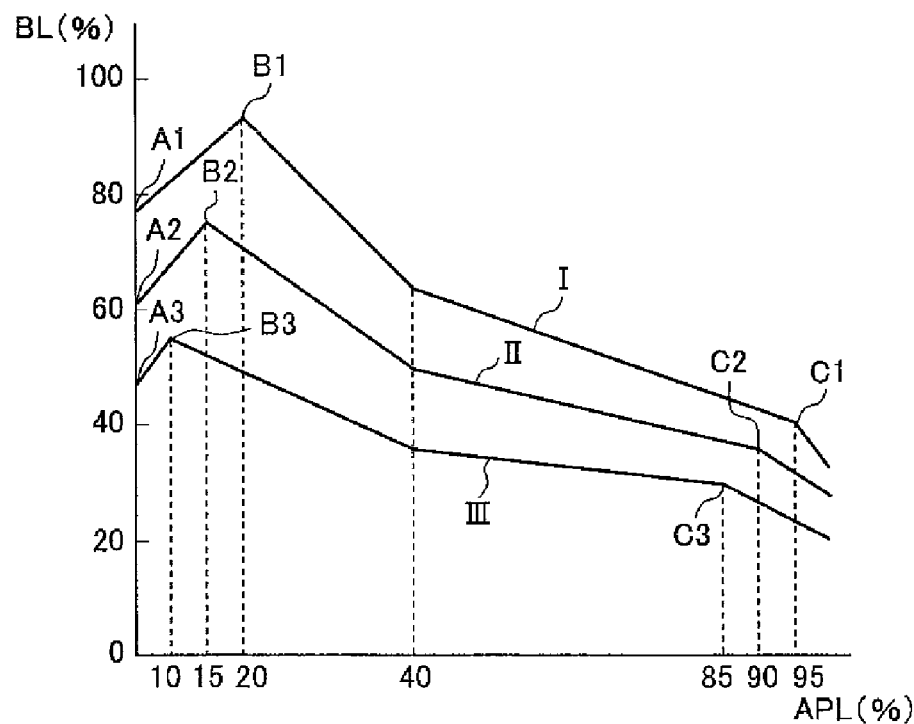
FIG. 11 is a diagram for explaining another example of the luminance control characteristic by the luminance control table selected corresponding to the brightness around the liquid crystal display apparatus.

FIG. 11 is a diagram for explaining another example of the luminance control characteristic by the luminance control table selected corresponding to the brightness around the liquid crystal display apparatus. Compared to the above example of FIG. 10, in the exemplary control of FIG. 11, the characteristic change points C1, C2 and C3 at which the characteristic changes from the second APL area to the third APL area are shifted toward the low-APL side as the surrounding environment becomes darker.

In this example, the position C of the characteristic change point is shifted toward the low-APL side from C1 to C3 and the range in the APL direction of the third APL area that provides the lowest luminance level is widened. In this case, for the range of the third APL area that provides the lowest luminance level, considering that the range with which the human feels dazzle is varied corresponding to the surrounding environment, the emission luminance for the third APL area on the whiter side having the lowest luminance level is reduced as the surrounding environment becomes darker and, at this time, the position in the APL direction of the characteristic change point that defines the third APL area is shifted to the low-APL side. The third APL area having the lowest emission luminance level is an area that includes the lowest emission luminance level of the backlight light source and with which the rate of reduction of the emission luminance of the backlight light source becomes larger as the APL that is the video feature quantity becomes larger. In this example, the characteristic change point C is shifted toward the low-APL side as the surrounding environment becomes darker. Therefore, the emission of the area with which the human feels dazzle can be suppressed and the power consumption of the backlight light source can be reduced.

Figure 12:
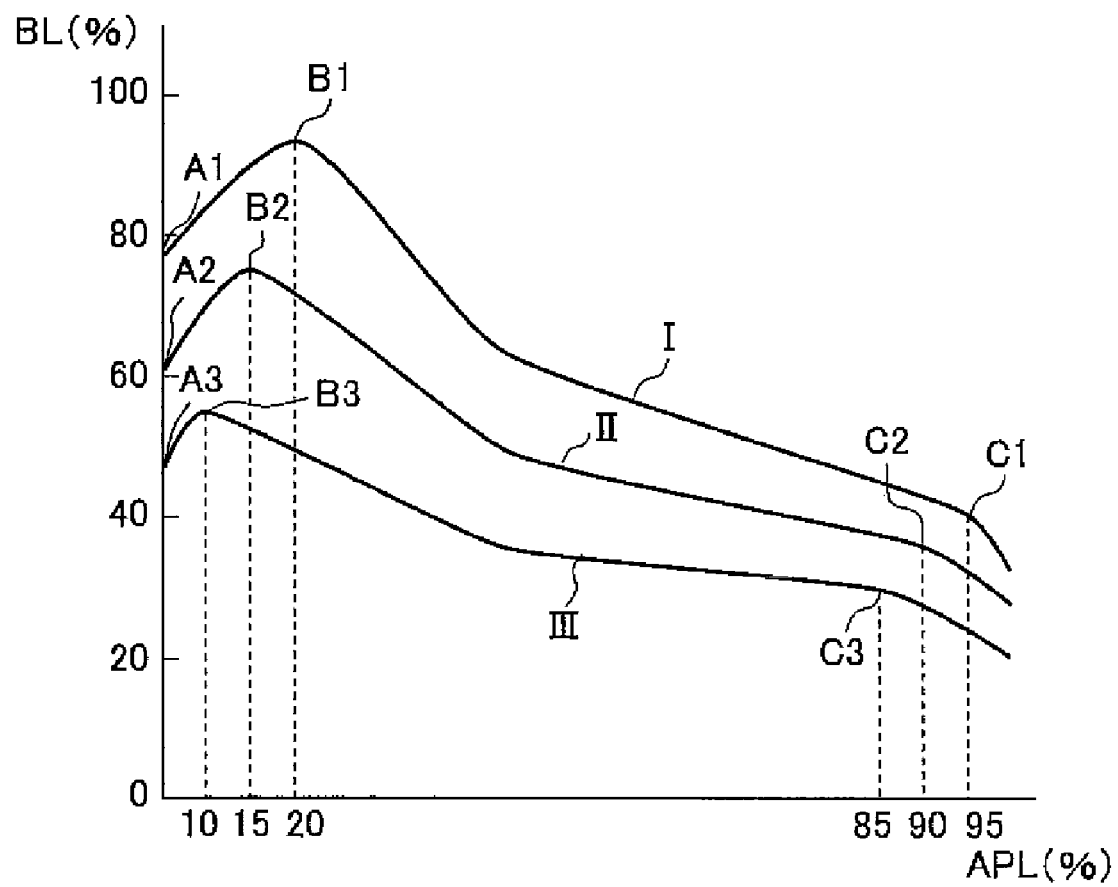
FIG. 12 is a diagram for explaining yet another example of the luminance control characteristic by the luminance control table selected corresponding to the brightness around the liquid crystal display apparatus.

FIG. 12 is a diagram for explaining yet another example of the luminance control characteristic by the luminance control table selected corresponding to the brightness around the liquid crystal display apparatus. FIG. 12 shows an exemplary setting of the non-linear luminance control characteristic by the same characteristic change point as that of the linear luminance control characteristic shown in FIG. 11.

In the example of FIG. 12, the luminance control characteristic (I) for the situation where the surround of the liquid crystal display apparatus is bright, the luminance control characteristic (II) for the situation where the surround is somewhat dark and the luminance control characteristic (III) for the situation where the surround is dark is set respectively as non-linear luminance control characteristics. In each of the luminance control characteristic, the characteristic change points B1 to B3 and C1 to C3 are defined from straight lines that approximate the non-linear characteristics. Though these approximated straight lines are not shown, the characteristic change points B1 to B3 and C1 to C3 are defined by assuming approximated straight lines using the above approach as in the FIG. 6 described above.

Similarly to the example of FIG. 11, in the example of FIG. 12, the characteristic change points B1 to B3 at which the characteristic shifts from the first APL area to the second APL area and the characteristic change points C1 to C3 at which the characteristic shifts from the second APL area to the third APL area are shifted toward the low-APL side as the surrounding environment becomes darker. Thereby, the contrast feeling that is mainly influenced by the low-APL area and the dazzle feeling that is mainly influenced by the high-APL area are controlled and, thereby, the screen display can be optimized and the power consumption of the backlight light source can be reduced.

In this manner, in the embodiments shown in FIGS. 10 to 12, the emission luminance of the backlight light source is varied corresponding to the brightness detected by the brightness detecting means and, in the luminance control characteristic, is varied in the area with which the emission luminance of the backlight light source becomes smaller than the highest emission luminance as the feature quantity of the input video signal becomes smaller is varied.

In FIG. 13, in a section for which the appearance frequency of the video signal is low and the APL of the input video signal is low (between A-B), the emission luminance of the backlight light source is set at a constant value at a high level. That is, the range between A-B of FIG. 13 is set as the first APL area.

Because the section for which the APL is low provides a dark video, influences such as the dazzle on the screen and stimulation to the eyes are a few even when the luminance of the backlight light source is set to be high. On the other hand, the gray level expression of dark video portions can be improved, peak portions in the dark screen can become conspicuous, and the video can be beautiful with contrast feeling.

In the APL area with a high appearance frequency of the video signal (between B-C), the emission luminance of the backlight light source is varied to become smaller as the APL becomes higher. Thereby, the dazzle on the screen and the stimulation to the eyes can be reduced and the video can be displayed with the proper luminance. That is, the range between B-C of FIG. 13 is set as the second APL area.

In the second APL area, a section with a higher appearance frequency of the APL of the video signal can be set such that the emission luminance of the backlight light source is varied more rapidly. In this case, a plurality of slopes of the second APL area may be set. For example, because the appearance frequency of the video signal of a section between B-F of FIG. 13(B) is higher than that of a section between F-C, the slope of the luminance control characteristic to the APL of the section between B-F can be set to be large (the slope of the section between B-F |X1|>the slope of the section between F-C |X2|). In this manner, by increasing the degree of increasing or decreasing of the luminance of the backlight for a screen having the APL with a high appearance frequency, reduction of the power consumption by the backlight light source is enabled.

In the section (between C-D) having a high APL of the input video signal, the emission luminance of the backlight light source is set to be low at a constant value, and the influence to the dazzle on the screen and the stimulation to the eyes is reduced as much as possible. That is, the range between C-D of FIG. 13 is set to be the third APL area.

As above, the control characteristic is set such that the range of the video feature quantity having a higher appearance frequency of the video signal has larger variation of the emission luminance of the backlight light source (the slope of the emission luminance of the backlight light source to the video feature quantity is increased), based on the histogram of the appearance frequency of the video signal corresponding to the video feature quantity (herein, the APL).

For FIG. 13, the above characteristic change points are the intersections B, F, and C of four straight lines.

In the above example, the luminance control characteristic as in the examples of FIGS. 7 and 8 may be used by connecting the second APL area between B-C with a straight line and setting characteristic change points to be two of B and C.

In this manner, the present invention varies the emission luminance of the light source to a video feature quantity and also varies the positions of the characteristic change points that are the points at which the slope of the luminance control characteristic changes, corresponding to the brightness of the surrounding environment regardless of the magnitude of the video feature quantity and, thereby, excessive emission luminance of the light source can be reduced for any video and the power consumption can be more effectively reduced. That is, even when the video feature quantity is large, the emission luminance to the video feature quantity is varied corresponding to the brightness of the surrounding environment and the area where the emission luminance of the light source is lowered to avoid the dazzle feeling for the viewer is widen and, thereby, the power consumption can be more effectively reduced.

According to the present invention, a plurality of characteristic change points are present that are points at which the slopes respectively of the luminance control characteristics change and the positions of the plurality of characteristic change points are shifted corresponding to the brightness of the surrounding environment and, thereby, for not only the areas for which the video feature quantity is small but also the areas for which the video feature quantity is large, the emission luminance of the light source is reduced to prevent a viewer from feeling dazzle and, therefore, the power consumption can be more effectively reduced.

According to the present invention, the positions of the characteristic change points that are the points at which the elements constituting the luminance control characteristic are changed are shifted corresponding to the brightness of the surrounding environment and at least one of the constants a and b in the equation expressing each of the elements that closely approaches the characteristic change points is varied and, thereby, the quantity to be reduced of the emission luminance of the light source can be optimally controlled for the APL area concerning the element. Therefore, the power consumption can be effectively reduced for either of the areas that are the area for which the video feature quantity is small that two elements approaching a characteristic change point sandwiching the point therebetween concerns and the area for which the video feature quantity is large.

As above, the change of the luminance control characteristic of the present invention enables a special action effect to be obtained that can not be expected to be obtained by simply shifting or elongating the luminance control characteristic or limiting the control ranges.

In the above example, the ALP is used as the video feature quantity of the input video signal and the control of the emission luminance of the backlight light source is executed corresponding to the APL. However, the above video feature quantity is not limited to the APL and, for example, the state (presence or absence, or high or low) of a peak luminance of one frame of the input video signal may be used.

In this case, when it is preferable to express the peak luminance for each surrounding environment (the brightness around the apparatus), by controlling the emission luminance of the backlight light source at a somewhat high level thereof, the peaks on the screen can be made conspicuous and, therefore, a beautiful video can be expressed. When the peak luminance does not need to be expressed so much, the emission luminance of the backlight light source is reduced as much as possible and, thereby, the power consumption of the backlight light source can be reduced.

Similarly, the emission luminance of the backlight may variably be controlled using the highest luminance level and the lowest luminance level in the predetermined area (term) in one frame, or the luminance distribution state (histogram), or based on the video feature quantity obtained by combining the above items as the video feature quantity of the input video signal.

When the APL is used, it is not necessary to obtain the average value of the luminance level of the video signal of the entire one frame to obtain the APL and, for example, the average value of the luminance level of the video signal around the center of the displayed video excluding the edge portion thereof is obtained and this average value may be used as the video feature quantity. For example, a video feature quantity of only a predetermined partial area may be measured by controlling the gate such that a screen area (likely to be superimposed with characters, symbols, etc.) being set in advance is excluded based on genre information separated and obtained from the broadcasting received signal.

When the switching of the emission luminance of the backlight corresponding to the feature quantity of the input video signal is caused to be gradually switched by providing a time constant thereto, no rapid luminance variation is caused and this is preferable from the viewpoint of stimulation to the eyes, the strange feeling, etc.

In the above description, the examples of executing the control of the emission luminance of the backlight corresponding to the brightness around the liquid crystal display apparatus have been shown. However, in addition, the control may be adapted to change the luminance control characteristic by calculation corresponding to the brightness around the liquid crystal display apparatus. In this case, a plurality of function expressions are prepared that have coefficients that vary corresponding to the feature quantity of the input video signal, and a predetermined function expression may be selected corresponding to the brightness around the liquid crystal display apparatus.

In addition to automatically switching the luminance control characteristic of the light source corresponding to the brightness around the liquid crystal display apparatus, employing a configuration with which a user can select the luminance control characteristic from a menu setting screen, etc., using a remote control apparatus 27, enables the user to use the luminance control characteristic that the user desires and, therefore, the usability can be improved.

The above luminance conversion control can be applied to not only a direct-viewing-type liquid crystal display apparatus including a backlight unit 17 as shown in FIG. 2 or 3 but also a projection type display device such as a liquid crystal projector. In this case, a video displayed is executed by also applying a light source light from the back side of the liquid crystal panel and the emission luminance of this light source light only has to be controlled according to the above luminance control characteristic.

Second Embodiment

Description will be given below for a second embodiment of the present invention. In the first embodiment, the description has been given for the display device that only controls such that the emission luminance of the light source is reduced as the APL of the input video signal becomes larger. However, in the embodiment, description will be given for a display device that controls such that the emission luminance of the light source is reduced as the APL of the input video signal becomes smaller, and that executes an expanding process of the video signal.

Figure 14:
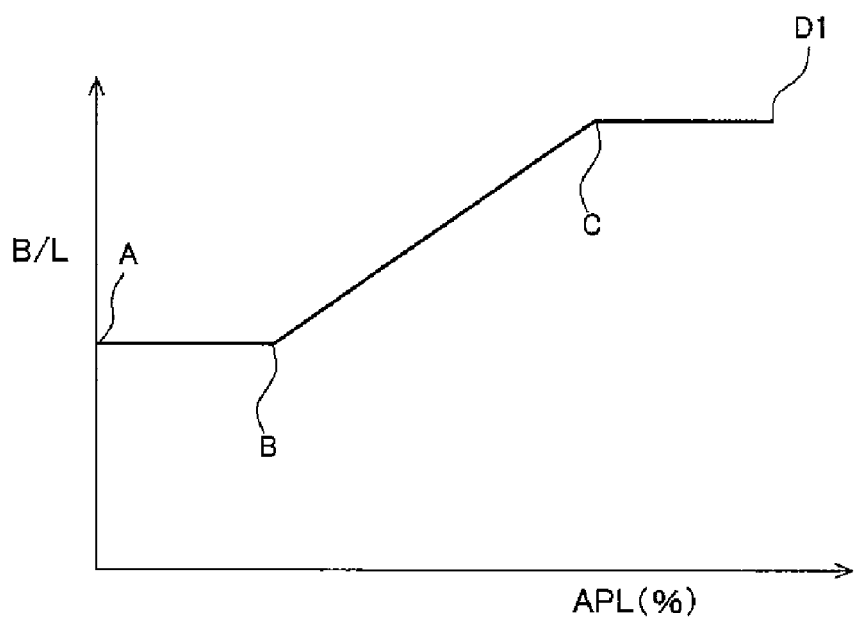
FIG. 14 is a diagram for explaining exemplary control of the emission luminance of the backlight light source using the luminance control table.

FIG. 14 is a diagram for explaining exemplary control of the emission luminance of the backlight light source using the luminance control table and shows an example of the shape of the luminance control characteristic applied to the embodiment.

FIG. 14 shows to change the control characteristic of the backlight light source corresponding to an area for which the APL is low indicated by a section between A-B ("first APL area"), an area for which the APL is at the intermediate level indicated by a section between B-C ("second APL area") and an area for which the APL is high indicated by a section between C-D ("third APL area").

FIG. 14 is a diagram for explaining exemplary control of the emission luminance of the backlight light source using the luminance control table and shows an example of the shape of the luminance control characteristic applied to the embodiment.

Figure 16:
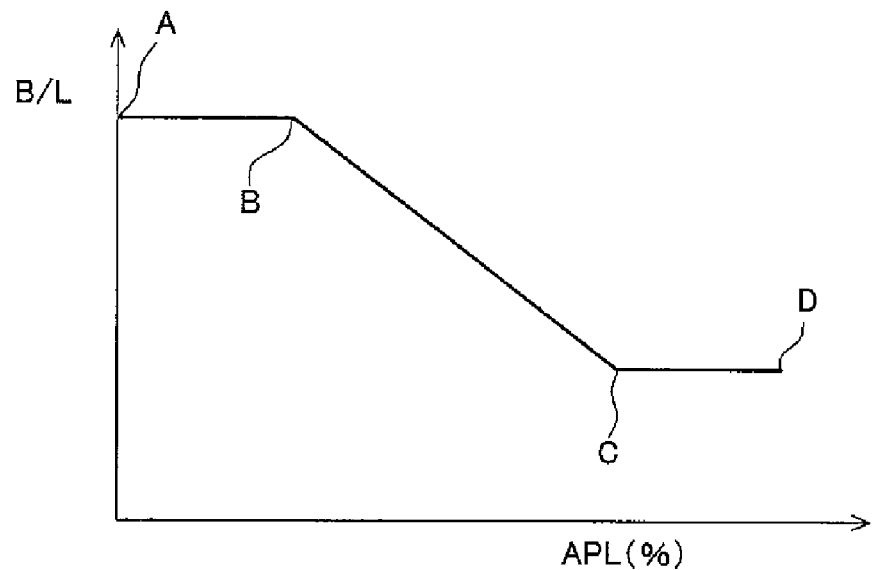
FIG. 16 is a diagram for explaining an exemplary control of video signal expansion using the video extension table.
Figure 17:
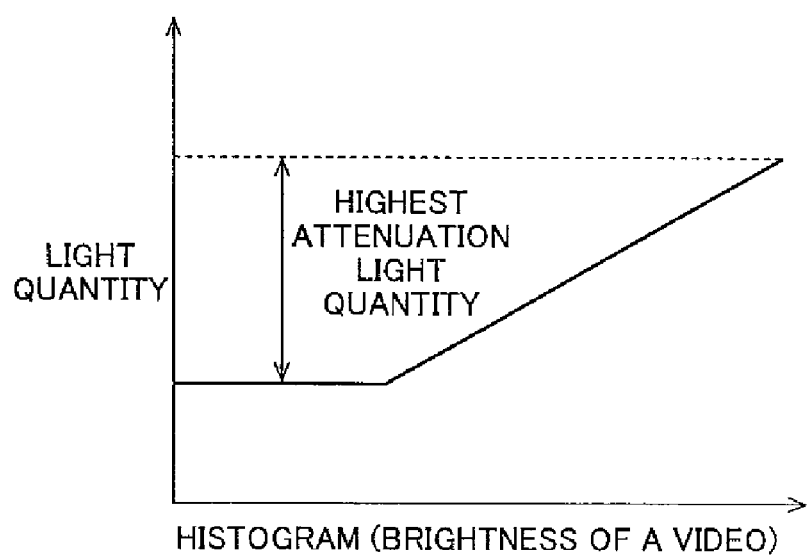
FIG. 17 is a diagram for explaining a histogram of the video in a conventional case and the characteristic of the light quantity of the light source.

FIG. 16 is a diagram for explaining an exemplary control of video signal expansion using the video extension table.

FIG. 16 shows to change the control characteristic of the expansion and compression of the video signal corresponding to an area for which the APL is low indicated by a section between A-B ("first APL area"), an area for which the APL is at the intermediate level indicated by a section between B-C ("second APL area") and an area for which the APL is high indicated by a section between C-D ("third APL area").

For the first APL area for which the APL of the input video signal is low (between A-B), the emission luminance of the backlight light source is set at a constant value at a low level and is set such that the video signal is expanded.

Because the Low-APL area provides a dark video, the emission luminance of the backlight light source is reduced and the video signal level is expanded and, thereby, the dynamic range is enlarged. Thereby, the black level is fully suppressed and the contrast feeling can be improved.

For the third APL area for which the APL of the input video signal is high (between C-D), the emission luminance of the backlight light source is set at a constant value at a high level and is set such that the video signal level is compressed. Thereby, occurrence of bleached-looking is suppressed.

For the second APL area that connects the above first APL area and the third APL area, the control is executed such that the emission luminance of the backlight is increased corresponding to the increase of the APL with the slope at a predetermined level and such that the compression rate of the video signal is increased corresponding to the increase of the APL with the slope at a predetermined level. That is, the emission luminance of the backlight is being increased while the video signal level is being compressed as the APL of the detected video signal becomes higher, and thereby the dazzle on the screen is being reduced while occurrence of the bleached-looking is suppressed.

As above, for the first APL area (blacker side), the backlight is controlled to emit at the lowest luminance level in the luminance control characteristic and, for the third APL area (whiter side), the backlight light source is controlled to emit at the highest luminance level in the luminance control characteristic.

In this case, a point at which the slope of the emission luminance control characteristic of the backlight light source to the video feature quantity (in this example, the APL) is changed is defined as a "characteristic change point". In FIG. 14, the two intersections B and C of the three straight lines AB, BC and CD are characteristic change points.

It is obvious that the luminance control characteristic that can be applied to the embodiments of the present invention is not limited to the above examples, and can properly be set corresponding to the emission characteristic and the power consumption of the backlight light source or the content of the video signal to be displayed, etc. In this case, the slope of the luminance control characteristic in each of the first to the third APL areas can arbitrarily be set and the number of the characteristic change points can also arbitrarily be set.

Description will be given for the luminance control table to change the emission luminance characteristic of the backlight light source corresponding to the brightness around the liquid crystal display apparatus.

Figure 15:
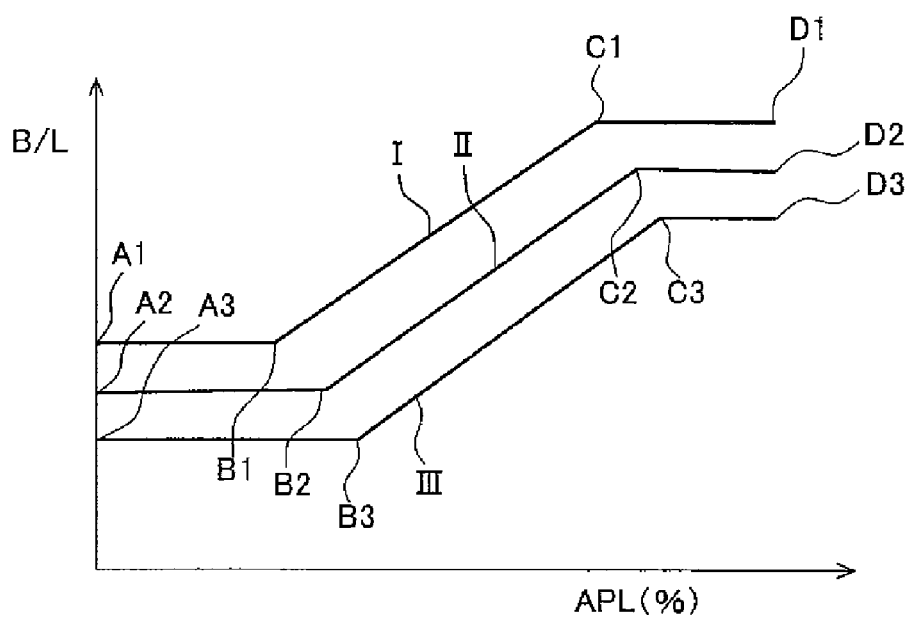
FIG. 15 is a diagram for explaining an example of the luminance control characteristic by the luminance control table selected corresponding to the brightness around the liquid crystal display apparatus.

FIG. 15 is a diagram for explaining an example of the luminance control characteristic by the luminance control table selected corresponding to the brightness around the liquid crystal display apparatus.

In the example, a plurality of luminance control tables that correspond to the brightness around the liquid crystal display apparatus are stored in the table storing memory 22. The microcomputer 21 of the liquid crystal display apparatus selects a luminance control table based on the brightness around the liquid crystal display apparatus measured using the brightness sensor 24, and controls the emission luminance of the backlight light source using the selected luminance control table.

The luminance control characteristics in the above plurality of luminance control tables are set as in FIG. 15. In the example of FIG. 15, the luminance control characteristics are set respectively for the three stages of the situation where the surround of the liquid crystal display apparatus is bright (for example, when the illuminance of the panel face of the liquid crystal panel is 100 lux or more) (I), where the surround is somewhat dark (for example, when the above illuminance is about 50 lux) (II) and where the surround is dark (for example, when the above illuminance is 10 lux or less) (III).

Each of the luminance control characteristics is set based on the idea of the exemplary luminance control characteristic shown in the above FIG. 14.

In this case, basically, the emission luminance of the backlight is increased as the surround of the liquid crystal display apparatus becomes darker.

When the surround of the liquid crystal display apparatus is a bright viewing environment, the display screen of the liquid crystal display apparatus needs to also be bright. Whether the display screen is felt to be dizzy varies depending on the surrounding environment. Considering this, for the signal area having a high APL (whiter side) for which dazzle is especially felt, the emission luminance of the backlight light source is reduced as the surrounding environment becomes darker. However, because the emission luminance for the bright surround is set to be high, the reduction rate of the emission luminance of the backlight light source to the brightness of the surrounding environment is set to be large compared to that for the signal area having a low-APL (blacker side).

When the backlight is always turned on at constant emission intensity, though the contrast ratio (CR) in a bright viewing environment is high, the contrast ratio is reduced in a dark viewing environment because so-called lighted black portions are visually recognized. However, the influence of the lighted black portions is a little for the signal area having the low APL (blacker side) because the luminance of the light source is maintained to be low. Therefore, the ratio of reducing the emission luminance of the backlight light source relative to the brightness of the surrounding environment as the surrounding environment becomes darker is reduced compared to that for the signal area having the high APL (whiter side).

As above, considering the different characteristics due to the "dazzle" and "contrast feeling" of the display screen, the luminance of the light source for each of the APL area with which the emission luminance of the light source is constant at the lowest level and the APL area with which the emission luminance of the light source is constant at the highest level is controlled corresponding to the brightness of the surround. Therefore, the control is not executed such that the luminance control characteristic is shifted corresponding to the brightness but the luminance control characteristic is set based on the following idea.

In the example of FIG. 15, as above, a luminance control characteristic (I) for the situation where the surround of the liquid crystal display apparatus is bright, a luminance control characteristic (II) for the situation where the surround is somewhat dark and the luminance control characteristic (III) for the situation where the surround is dark is set.

The embodiment is characterized in that, for each of the luminance control characteristics (I) to (III), the positions of the above characteristic change points are changed in the APL direction and, thereby, each luminance control characteristic can be optimized for each surrounding environment.

In this case, each luminance control characteristic basically has the low-APL first area on the blacker side, the intermediate-level-APL second area and the high-APL third area on the whiter side.

For the low-APL first APL area, the luminance control characteristic is set to be a straight line. This straight line section indicates the lowest luminance level in the luminance control characteristic. In this example, the lowest luminance level in the first APL area is reduced as the surround of the liquid crystal display apparatus becomes darker and, simultaneously, the position of the characteristic change point that defines the range of the lowest luminance level is shifted toward the high-APL side (whiter side). That is, the characteristic change point B2 of the luminance control characteristic (II) is shifted toward the high-APL side relative to the characteristic change point B1 of the luminance control characteristic (I) and, in addition, the characteristic change point B3 of the luminance control characteristic (III) is shifted toward the high-APL side.

Generally, in the visual characteristic of the human, when the surrounding environment is dark, the contrast feeling is relatively enhanced. That is, in the case where the emission luminance of the light source is the lowest for the low-APL signal area (blacker side), even when the luminance of the backlight is reduced as the surrounding environment becomes darker, the APL area with which sufficient contrast feeling can be obtained is extended toward the high-APL side. Therefore, for an area having a higher APL than that of an area in the low-APL side with which the luminance is the lowest, the luminance of the backlight is excessive and sufficient contrast feeling can be obtained even when the luminance of the backlight is excessively reduced.

That is, in the above example, the emission luminance level of the backlight light source is reduced as the surrounding environment of the liquid crystal display apparatus becomes darker and, simultaneously, the position B of the characteristic change point is shifted toward the high-APL side from B1 to B3 and, thereby, the range in the APL direction of the first APL area that provides the lowest luminance level is widened. In this case, it is assumed that the range of the first APL area that provides the lowest luminance level is an APL area with which the sufficient contrast feeling can be obtained by expanding the image signal level even when the luminance of the backlight is reduced. Because the luminance of the backlight is excessive to the extent that the surrounding environment has become darker for the high-APL side exceeding the range, the emission luminance of the light source is gradually reduced.

In this manner, the emission luminance of the first APL area on the blacker side having the lowest luminance level is reduced as the surrounding environment becomes darker and, simultaneously, the position in the APL direction of the characteristic change point that defines the first APL area is shifted toward the high-APL side and, thereby, the area with which the emission is executed at the lowest emission is widened. Therefore, the human can obtain sufficient contrast feeling and excessive emission can be suppressed and, therefore, the power consumption of the backlight light source can be reduced.

Based on the change of the position of the characteristic change point, description has been given for the change of the luminance control characteristic corresponding to the brightness of the surround. However, this can also be described as follows. That is, the luminance control characteristic is constituted of the plurality of elements that each can directly or approximately expressed by the equation $y=ax+b$ (where $x$=feature quantity of the input video signal, $y$=emission luminance of the light source, and "a" and "b"=constants) and the position of the characteristic change point is varied and, simultaneously, at least one of the constants $a$ and $b$ in the equation expressing the element that closely approaches the characteristic change point is changed and, thereby, the change of the luminance control characteristic may be executed. This will be descried as follows.

In the example of FIG. 15, a section of a straight-line luminance control characteristic indicated by A1-B1, etc., is defined as an element. That is, the luminance control characteristic (I) is constituted of three straight-line luminance control characteristic sections of the one between A1-B1, the one between B1-C1 and the one between C1-D1 and, therefore, is constituted of three elements. The section between A1-B1 is denoted by "element 1". The section between B1-C1 is denoted by "element 2". The section between C1-D1 is denoted by "element 3". Each of the elements can be expressed by an equation $y=ax+b$ (where $x$=feature quantity of the input video signal, $y$=emission luminance of the light source, and "a" and "b"=constants). However, the characteristic of FIG. 7 is set based on the idea of the luminance control characteristic shown in FIG. 4 and, therefore, the element 1 and the element 3 each have a constant emission luminance. Therefore, the equation for each element can be expressed as the element 1: $y=b1$, the element 2: $y=a2x+b2$ and the element 3: $y=b3$. When the characteristic is changed from the luminance control characteristic (I) to the luminance control characteristic (II), noting the characteristic change points B1 and B2, the characteristic change point B2 of the luminance control characteristic (II) is shifted toward the low-emission luminance side and the high-APL side relative to the characteristic change point B1 of the luminance control characteristic (I). Simultaneously, the constant $b1$ in the equation expressing the element 1 that is one of the elements closely approaching the characteristic change point B1 is changed to a value that is lower than b1 (denoted by "b1'"). The constant a2 in the equation expressing the element 2 that is the other element closely approaching the characteristic change point B1 is changed to a somewhat lower value than itself (denoted by "a2'") and the constant b2 in the same equation is changed to a value that is lower than b2 (denoted by "b2'").

For example, when it is more preferable in terms of suppressing excessive emission that the emission luminance is somewhat reduced in the low-APL direction for the element 1 of the luminance control characteristic (II), a more preferable characteristic can be set by changing the equation of the element 1 of the luminance control characteristic (II) from Y=b1' to Y=a1'x+b1" (a1'>0, b1"<b1'). When it is more preferable in terms of suppressing excessive emission that the element 2 of the luminance control characteristic (II) is somewhat reduced in the high-APL direction in terms of the emission luminance, a more preferable characteristic can be set by changing the equation of the element 2 of the luminance control characteristic (II) from y=a2'x+b2' to y=a2"x+b2" (a2"<a2', b2">b2').

In this manner, more meticulous control can be executed by executing the change of the luminance control characteristic that is executed according to the surrounding brightness by changing at least one of the constants a and b in the equation of a straight line indicating an element that closely approaches the characteristic change point, in addition to changing the characteristic change points. Therefore, the power consumption of the backlight light source can be more reduced.

As above, the present invention may be applied to an apparatus for which the emission luminance control of the light source is executed corresponding to the feature quantity of the input video signal and, simultaneously, an expanding process of the video signal is executed and, thereby, the contrast feeling of the displayed video can be improved.

The invention claimed is:

1. A liquid crystal display apparatus that has a liquid crystal panel that displays a video by an input video signal, a light source that illuminates the liquid crystal panel, and a brightness detecting means to detect the surrounding brightness; and the liquid crystal display apparatus is adapted to change the luminance control characteristic thereof that defines the emission luminance of the light source to at least one feature quantity concerning the brightness of the input video signal corresponding to the brightness detected by the brightness detecting means, wherein
the emission luminance of the light source is reduced to the feature quantity corresponding to decrease of the brightness detected by the brightness detecting means, and wherein
the apparatus changes the luminance control characteristic by shifting the position of a characteristic change point, at which the slope of the luminance control characteristic changes, in the direction along which the emission luminance of the light source is reduced and, simultaneously shifting the position of the characteristic change point in order to (a) reduce a size of a region of the feature quantity that provides the highest brightness as the emission luminance of the light source is reduced or (b) increase a size of a region of the feature quantity that provides the lowest brightness as the emission luminance of the light source is increased.

2. The liquid crystal display apparatus as defined in claim 1, wherein
the characteristic change points are respectively intersections formed when the luminance control characteristics are approximated respectively by straight lines.

3. The liquid crystal display apparatus as defined in claim 1, wherein
the average luminance level for at least each one frame of the input video signal is used as the feature quantity.

4. The liquid crystal display apparatus as defined in claim 3, wherein
the input video signal is expanded, and wherein
the emission luminance of the light source is controlled simultaneously with expansion.

5. The liquid crystal display apparatus as defined in claim 3, wherein
a gradation conversion characteristic to the input video signal is varied, and wherein
the emission luminance of the light source is controlled simultaneously with variation of the gradation.

6. The liquid crystal display apparatus as defined in claim 1, wherein
the input video signal is expanded, and wherein
the emission luminance of the light source is controlled simultaneously with expansion.

7. The liquid crystal display apparatus as defined in claim 1, wherein
a gradation conversion characteristic to the input video signal is varied, and wherein
the emission luminance of the light source is controlled simultaneously with variation of the gradation.

8. A liquid crystal display apparatus that has a liquid crystal panel that displays a video by an input video signal, a light source that illuminates the liquid crystal panel, and a brightness detecting means to detect the surrounding brightness; and the liquid crystal display apparatus is adapted to change the luminance control characteristic thereof that defines the emission luminance of the light source to at least one feature quantity concerning the brightness of the input video signal corresponding to the brightness detected by the brightness detecting means, wherein
a plurality of characteristic change points are present that each is point at which the slope of the luminance control characteristic is varied, and wherein
corresponding to decrease of the brightness detected by the brightness detecting means, shifting the positions of the plurality of characteristic change points in the direction along which the emission luminance of the light source is reduced and, simultaneously and shifting the positions of the plurality of change points in order to (a) reduce a size of a region of the feature quantity that provides the highest brightness as the emission luminance of the light source is reduced or (b) increase a size of a region of the feature quantity that provides the lowest brightness as the emission luminance of the light source is increased.

9. The liquid crystal display apparatus as defined in claim 8, wherein
the characteristic change points are respectively intersections formed when the luminance control characteristics are approximated respectively by straight lines.

* * * * *